(12) United States Patent
Benoit et al.

(10) Patent No.: US 9,811,470 B2
(45) Date of Patent: Nov. 7, 2017

(54) METHOD AND SYSTEM FOR SELF-TUNING CACHE MANAGEMENT

(71) Applicant: VANTRIX CORPORATION, Montreal (CA)

(72) Inventors: Louis Benoit, St-Lazare (CA); Sebastien Cote, Montreal (CA); Robert Buchnajzer, Montreal (CA)

(73) Assignee: VANTRIX CORPORATION, Montreal (CA)

(*) Notice: Subject to any disclaimer, the term of this patent is extended or adjusted under 35 U.S.C. 154(b) by 0 days.

(21) Appl. No.: 14/828,428

(22) Filed: Aug. 17, 2015

(65) Prior Publication Data

US 2015/0356021 A1 Dec. 10, 2015

Related U.S. Application Data

(63) Continuation of application No. 13/596,169, filed on Aug. 28, 2012, now Pat. No. 9,112,922.

(51) Int. Cl.
*G06F 12/00* (2006.01)
*G06F 12/0888* (2016.01)
(Continued)

(52) U.S. Cl.
CPC ...... *G06F 12/0888* (2013.01); *G06F 12/0871* (2013.01); *G06F 12/123* (2013.01);
(Continued)

(58) Field of Classification Search
CPC ............ G06F 12/0888; G06F 12/0871; G06F 12/123; G06F 2212/1044; G06F 2212/464; H04L 67/2852
See application file for complete search history.

(56) References Cited

U.S. PATENT DOCUMENTS

| 5,978,370 A | 11/1999 | Shively |
| 6,289,358 B1 | 9/2001 | Mattis et al. |

(Continued)

FOREIGN PATENT DOCUMENTS

| CN | 1859610 | 11/2006 |
| CN | 101184091 | 5/2008 |

(Continued)

OTHER PUBLICATIONS

"Multimedia Adaptation for Multimedia Messaging Service" Stephane Coulombe and Guido Grassel, IEEE Communication Magazine, vol. 42, No. 7, p. 120-126, Jul. 2004.
(Continued)

*Primary Examiner* — Charles Rones
*Assistant Examiner* — Nanci Wong
(74) *Attorney, Agent, or Firm* — IP-MEX Inc.; Victoria Donnelly

(57) ABSTRACT

Web objects, such as media files are sent through an adaptation server which includes a transcoder for adapting forwarded objects according to profiles of the receiving destinations, and a cache memory for caching frequently requested objects, including their adapted versions. The probability of additional requests for the same object before the object expires, is assessed by tracking hits. Only objects having experienced hits in excess of a hit threshold are cached, the hit threshold being adaptively adjusted based on the capacity of the cache, and the space required to store cached media files. Expired objects are collected in a list, and may be periodically ejected from the cache, or when the cache is nearly full.

22 Claims, 11 Drawing Sheets

(51) Int. Cl.
  *H04L 29/08*       (2006.01)
  *G06F 12/0871*     (2016.01)
  *G06F 12/123*      (2016.01)
(52) U.S. Cl.
  CPC .. *H04L 67/2852* (2013.01); *G06F 2212/1044* (2013.01); *G06F 2212/464* (2013.01)

(56) References Cited

U.S. PATENT DOCUMENTS

| | | | |
|---|---|---|---|
| 6,470,378 | B1 | 10/2002 | Tracton et al. |
| 6,483,851 | B1 | 11/2002 | Neogi |
| 6,563,517 | B1 | 5/2003 | Bhagwat et al. |
| 6,615,253 | B1 | 9/2003 | Bowman-Amuah |
| 6,785,732 | B1 | 8/2004 | Bates et al. |
| 6,813,690 | B1 | 11/2004 | Lango et al. |
| 6,888,477 | B2 | 5/2005 | Lai et al. |
| 6,970,602 | B1 | 11/2005 | Smith |
| 7,010,581 | B2 | 3/2006 | Brown |
| 7,076,544 | B2 | 7/2006 | Katz et al. |
| 7,409,464 | B2 | 8/2008 | Jansson |
| 7,475,106 | B2 | 1/2009 | Agnoli |
| 7,549,052 | B2 | 6/2009 | Haitsma |
| 7,577,848 | B2 | 8/2009 | Schwartz |
| 7,640,274 | B2 | 12/2009 | Tinker |
| 7,692,666 | B1 | 4/2010 | Bourgoin et al. |
| 7,831,900 | B2 | 11/2010 | Lee |
| 7,876,766 | B1 | 1/2011 | Atkins et al. |
| 7,890,619 | B2 | 2/2011 | Morota et al. |
| 2001/0024386 | A1* | 9/2001 | Harari ............... G06F 3/0614 365/200 |
| 2002/0087797 | A1 | 7/2002 | Adrangi |
| 2002/0103972 | A1 | 8/2002 | Satran |
| 2002/2010397 | | 8/2002 | Satran |
| 2002/0178271 | A1 | 11/2002 | Graham et al. |
| 2003/0097564 | A1 | 5/2003 | Tewari |
| 2003/0145232 | A1 | 7/2003 | Poletto et al. |
| 2004/0001106 | A1 | 1/2004 | Deutscher |
| 2004/0024897 | A1 | 2/2004 | Ladd et al. |
| 2004/0032348 | A1 | 2/2004 | Lai et al. |
| 2004/0111476 | A1 | 6/2004 | Trossen et al. |
| 2004/0181550 | A1 | 9/2004 | Warsta et al. |
| 2004/0221120 | A1 | 11/2004 | Abrashkevich et al. |
| 2004/0268224 | A1 | 12/2004 | Balkus |
| 2005/0055721 | A1 | 3/2005 | Zigmond et al. |
| 2005/0187756 | A1 | 8/2005 | Montgomery |
| 2006/0010226 | A1 | 1/2006 | Hurtta et al. |
| 2006/0029192 | A1 | 2/2006 | Duddley et al. |
| 2006/0095452 | A1 | 5/2006 | Jansson et al. |
| 2006/0156218 | A1 | 7/2006 | Lee |
| 2006/0161153 | A1 | 7/2006 | Kiilerich |
| 2006/0161538 | A1 | 7/2006 | Kiilerich |
| 2006/0174300 | A1 | 8/2006 | Gu et al. |
| 2006/0242550 | A1 | 10/2006 | Rahman |
| 2007/0011256 | A1 | 1/2007 | Klein |
| 2007/0067390 | A1 | 3/2007 | Agnoli et al. |
| 2007/0150877 | A1 | 6/2007 | Emmett et al. |
| 2007/0204318 | A1 | 8/2007 | Ganesh |
| 2007/0216761 | A1 | 9/2007 | Gronner et al. |
| 2008/0001791 | A1 | 1/2008 | Wanigasekars-Mohotti et al. |
| 2008/0001797 | A1 | 1/2008 | Wanigasekara-Mohotti et al. |
| 2008/0086435 | A1 | 4/2008 | Chesla |
| 2008/0140720 | A1 | 6/2008 | Six et al. |
| 2008/0155056 | A1 | 6/2008 | Zimowski |
| 2008/0196076 | A1 | 8/2008 | Shatz et al. |
| 2008/0201341 | A1 | 8/2008 | Okamoto et al. |
| 2008/0201386 | A1 | 8/2008 | Maharaj et al. |
| 2008/0226173 | A1 | 9/2008 | Yuan |
| 2008/0229429 | A1 | 9/2008 | Krig |
| 2008/0270436 | A1 | 10/2008 | Fineberg et al. |
| 2009/0083279 | A1 | 3/2009 | Nair |
| 2009/0088191 | A1 | 4/2009 | Norton et al. |
| 2009/0125677 | A1 | 5/2009 | Leveque |
| 2009/0172286 | A1 | 7/2009 | Lasser et al. |
| 2009/0193485 | A1 | 7/2009 | Rieger et al. |
| 2009/0280844 | A1 | 11/2009 | Norton et al. |
| 2009/0067357 | A1 | 12/2009 | Norton |
| 2009/0316715 | A1* | 12/2009 | Saniee ............... H04N 7/17336 370/429 |
| 2010/0087179 | A1 | 4/2010 | Makavy |
| 2010/0094817 | A1 | 4/2010 | Ben-Shaul et al. |
| 2010/0114816 | A1 | 5/2010 | Kiilerich |
| 2010/0153495 | A1 | 6/2010 | Barger |
| 2010/0195538 | A1 | 8/2010 | Merkey et al. |
| 2010/0281112 | A1 | 11/2010 | Plamondon |
| 2010/0318632 | A1 | 12/2010 | Yoo et al. |
| 2011/0106822 | A1 | 5/2011 | Golwalkar et al. |
| 2011/0131298 | A1 | 6/2011 | Courtmanche |
| 2011/0153867 | A1 | 6/2011 | Van De Ven et al. |
| 2011/0161409 | A1 | 6/2011 | Hasek |
| 2011/0179219 | A1 | 7/2011 | Ma et al. |
| 2011/0264865 | A1* | 10/2011 | Mobarak ............... G06F 12/121 711/141 |
| 2011/0271007 | A1 | 11/2011 | Wang et al. |
| 2012/0110036 | A1 | 5/2012 | Rabii |
| 2012/0173907 | A1* | 7/2012 | Moses ............... G06F 1/3225 713/321 |
| 2012/0323872 | A1* | 12/2012 | Vasquez Lopez G06F 17/30132 707/704 |
| 2013/0024431 | A1 | 1/2013 | Parthasarathy et al. |
| 2013/0042022 | A1 | 2/2013 | Norton et al. |
| 2013/0046849 | A1* | 2/2013 | Wolf ............... H04L 67/2842 709/217 |
| 2013/0204961 | A1* | 8/2013 | Fliam ............... H04L 67/2885 709/214 |
| 2014/0044127 | A1 | 2/2014 | Li et al. |
| 2014/0052812 | A1 | 2/2014 | Ozawa |

FOREIGN PATENT DOCUMENTS

| | | |
|---|---|---|
| EP | 1001582 A2 | 5/2000 |
| EP | 1460848 A2 | 9/2004 |
| EP | 1482735 | 12/2004 |
| JP | 09325413 | 12/1997 |
| JP | 2001-007809 | 4/2001 |
| JP | 2001-117809 | 4/2001 |
| JP | 2002108870 | 12/2002 |
| JP | 2003143575 | 5/2003 |
| JP | 2003337739 | 11/2003 |
| JP | 2004078354 | 3/2004 |
| JP | 2004-526227 | 8/2004 |
| JP | 2005-527881 | 9/2005 |
| JP | 2007053699 | 3/2007 |
| JP | 2007-158687 | 6/2007 |
| WO | 2002052730 | 7/2002 |
| WO | 2003040893 | 5/2003 |
| WO | WO 2004/088951 | 10/2004 |
| WO | WO2004097688 A1 | 11/2004 |
| WO | WO2006/023302 | 3/2006 |
| WO | WO 2007/032606 | 3/2007 |
| WO | 2007037726 | 4/2007 |
| WO | WO2007037726 A1 | 4/2007 |
| WO | WO 2007/060521 | 5/2007 |
| WO | WO 2007/075201 | 7/2007 |
| WO | WO2012-088023 A2 | 6/2012 |

OTHER PUBLICATIONS

International Search Report issued by CIPO for PCT/CA2008/002286 dated Apr. 20, 2009.

Coskun, Bads, Sankur, Bulent "Robust Video Hash Extraction" article available at <citeseerx.ist.psu.edu/viewdoc/download?doi=10.1.1.113.9934.pdf> European Signal Processing Conference EUSIPCO 2004.

OMA Multimedia Messaging Service, Architecture Overview, Approved Version 1.2 01, published by Open Mobile Alliance, available from http://www.openmobilealliance.org/release_program/mms_v1_2.html, Mar. 2005.

Open Mobile Alliance document OMA-AD-STI-V1_0-20270515-A "Architecture of the Environment using the Standard Transcoding Interface" Approved Version 1.0—15, published by Open Mobile Alliance, May 2007.

(56) References Cited

OTHER PUBLICATIONS

3GPP TS 26.140 V7.1.0, Technical Specification 3rd Generation Partnership Project;Technical Specification Group Services and System Aspects; Multimedia Messaging Service (MMS); Media formats and codecs (Release 7) available from http://www.3gpp.org/ftp/Specs/html-info/26140.htm, Jun. Jun. 2007.
Relational Database System (RDBS), available from http://www.mysql.org/ published by Sun Microsystems, available prior to Nov. 12, 2007.
Request for Comments (RFC)1321 "The MD5 Message-Digest Algorithm", R. Revest, available from http://tools.ietf.org/html/rfc1321 published by IEFT (Internet Engineering Task Force) Apr. 1992.
MM1, MM3, MM4, MM7 are defined by the 3GPP in 3GPP TS 23.140 V6.14.0 (Nov. 6, 2006) Technical Specification 3rd Generation Partnership Project; Technical Specification Group Core Network and Terminals; Multimedia Messaging Service (MMS); Functional description; Stage 2 (Release 6) at http://www.3gpp.org/ftp/Specs/html-info/23140.htm (document http://www.3gpp.org/FTP/Specs/archive/23_series/23.140/23140-6e0.zip), Nov. 6, 2006.
"Internet Content Adaptation Protocol (ICRP)" J. Elson, Request for Comments (RFC) 3597 available from http://www.ietf.org/rfc/rfc3507.txt, Apr. 2003.
Nokia Multimedia Messaging Service Center, External Application Interface, Frequently Asked Questions, Reference for External Application Interface (EAIF) protocol available at http://www.forum.nokia.com/info/sw.nokia.com/id/d0ee4125-3879-4482-b55d-90e3afe17a31/Ext_App_Interface_FAQ.pdf.html published by Nokia, prior to Nov. 12, 2007.
Synchronized Multimedia Integration Language (SMIL) 1.0 Specification, published by W3C organization at http://www.w3.org/TR/REC-smil Jun. 15, 1998.
Tayeb Lemlouma, Nabil Layaida "Encoding Multimedia Presentations for User Preferences and Limited Environments" Proceedings of IEEE International Conference on Maultimedia &Expo (ICME), IEEE Computer Society, 2003, p. 165-168.
Multimedia Messaging Service, Media Formats and Codecs 3GPP TS 26.140, V 7.1.0, http://www.3gpp.org/ftp/specs/html-info/26140.htm, Jun. 2007, p. 13.
S.Coulombe et al., Multimedia Adaptation for the Multimedia Messaging Service, IEEE Communication Magazine, vol. 42, No. 7, p. 120-126, Jul. 2004.
3GPP in 3GPP TS 23.140 V6.14.0 (Nov. 6, 2006), Technical Specification 3rd Generation Partnership Project, Technical Specification Group Core Network and Terminals, Multimedia Messaging Service (MMS), Functional description, Stage 2 (Release 6), http://www.3gpp.org/ftp/Specs/html-info/23140.htm (document http://www.3gpp.org/FTP/Specs/archive/23_series/23.140/23140-6e0.zip).
Xing Su, Tiejun Huang, Wen Gao, "Robust Video Fingerprinting Based on Visual Attention Regions", IEEE International Conference on Acoustics Speech and Signal Processing, available on internet at <http://www.jdl.ac.cn/doc/2009/ROBUST%20VIDEO%20FINGERPRINTING%20BASED%20ON%20VISUAL%20ATTENTION%20REGIONS.pdf>, Apr. 19-24, 2009.
Matthijs Douze, Herv'e J'egou and Cordelia Schmid, "An Image-Based Approach to Video Copy Detection with Spatio-Temporal Post-Filtering" IEEE Transactions on Multimedia, No. 4, pp. 257-266, available on the internet at <http://lear.inrialpes.fr/pubs/2010/DJS!)/douze_tmm.pdf>, 2010.
JPEG—Wikipedia, the free encyclopedia, http://en.wikipedia.org/wiki/JPEG, Aug. 5, 2007.
Advanced Audio Coding—Wikipedia, the free encyclopedia, http://en.wikipedia.org/wiki/Advanced_Audio_Coding, Aug. 5, 2010.
Synchronized Media Integration Language (SMIL) 2.0 Specification W3C Recommendation http://www.w3.org/TR/smil20/, Aug. 7, 2001.
"The independent JPEG Group" ftp.uu.net/graphics/jpeg/jpegsrc.v6b.tar.gz, Aug. 3, 2007.
International Search Report and Written Opinion rendered by Canadian Intellectual Property Office, dated Sep. 30, 2008.

* cited by examiner

METHOD AND SYSTEM FOR SELF-TUNING CACHE MANAGEMENT

RELATED APPLICATIONS

The present application is a Continuation of U.S. application Ser. No. 13/596,169, which has issued into a U.S. Pat. No. 9,112,922 on Aug. 18, 2015, entire contents of which are incorporated herein by reference.

FIELD OF THE INVENTION

The present invention relates the caching of media files and adapted versions of same.

BACKGROUND OF THE INVENTION

Media files, for example in the form of video streams provided from video servers, are requested by clients over the internet in increasing numbers. In many cases, capabilities of the client's terminal or bandwidth limitations, may make it necessary or advantageous to process the original media file received from the video server, by adapting it.

FIG. 1 illustrates a general media delivery system 100 of the prior art, including one or more media source nodes 102, a number of media client nodes 104.1 to 104.N, and a media adaptation server 106. A network 108, typically the Internet, provides connectivity between the media source nodes 102 and the media adaptation server 106, as well as between the media adaptation server 106 and the media client nodes 104.

The media adaptation server 106 includes an adaptation engine 110 for processing original media files received from the media source node 102 as required, into adapted versions of the respective media files, before forwarding the adapted versions to the requesting media client node 104. In some cases, the original media file may be forwarded unprocessed to a media client node 104. The individual type of media adaptation for each media client node 104 depends on characteristics of the receiving node, which may be stored in a terminal profile database 112 of the media adaptation server 106. Media adaptation may include various processing functions such as transcoding, coding format conversion, trans-rating, trans-sizing, encryption and compression, to mention just a few.

The media adaptation server 106 may further include a media cache 114, for caching requested media files as well as adapted media files. A major purpose of caching media files, including adapted media files, is to avoid having to repeatedly download the original media file from the media source node 102 and re-adapting it.

However, existing systems have not fully provided the caching of media files in a way to utilize the cache capacity more effectively.

Accordingly, a method and system to improve the efficiency and utility of caching media files, including adapted media files, is required.

SUMMARY OF THE INVENTION

Therefore there is an object of the invention to provide an improved method and system for cache management, which would avoid or mitigate shortcomings of the prior art.

According to one aspect of the invention, there is provided a method for caching objects in a cache of predetermined capacity having a cache size threshold less than the predetermined capacity, the method comprising:

(a) receiving a request, a hit, for an object;
(b) creating a plurality of hit buckets forming a hits distribution list, comprising:
  (i) associating a corresponding number of hits with each bucket;
  (ii) in said each bucket, storing accumulated sizes of objects having a number of hits corresponding to said each bucket;
(c) computing a hit threshold, comprising:
  accumulating contents of the hit buckets having the highest hit numbers, without exceeding the cache size threshold;
  selecting a lower hit number as the hit threshold;
(d) caching the object only if a hit number for the object exceeds the hit threshold; and
(e) repeating steps (a) to (d).

The method further comprises:
recording the object in a time-to-live (TTL) window in an order of an expiry time of the object; and
the step (d) further comprising:
  determining that there is space in the cache for caching the object;
  scanning the TTL window to locate expired objects whose expiry time has past; and
  removing the expired objects from the cache.

In an embodiment of the invention, the TTL window is divided into TTL buckets, each TTL bucket used to record objects whose expiry time falls within a predetermined time range.

In the method described above the step (d) further comprises:
  determining a time to live (TTL) of each received object;
  updating an average time to live (TTL_avg) with the TTL of each received object; fixing the value of the TTL_avg until a predetermined cache size threshold is reached; and
  arranging the TTL window as a circular array of TTL_buckets whose combined range corresponds to the TTL_avg.

In the method described above, the predetermined time range is used as a hit threshold update interval (T_upd), and the step (c) is performed at every successive hit threshold update interval.

In the method of the embodiments of the invention, the caching of objects is performed in two stages, a convergence phase, starting when a first request for an object is received, wherein a convergence cache size threshold is gradually increased at a rate which is a function of the TTL_avg until the cache size threshold is reached, at which time a plateau phase begins, wherein a plateau cache size threshold is fixed at the level reached by the of convergence cache size threshold at the end of the convergence phase.

According to another aspect of the invention, there is provided a method of caching one of a plurality of objects in a cache of predetermined capacity having a cache size threshold less than the predetermined capacity, comprising:
  registering a descriptor of each of the plurality of objects in an object registry upon a first request for each respective object, the descriptor including a respective expiry time for the corresponding object;
  storing a reference to each object in a list sorted essentially according to the respective expiry time;
  determining an adaptive hit threshold (HT) for caching as a function of the sizes of objects already cached and the cache size threshold, and caching each object only after it has received more than HT requests;

removing the descriptor of each corresponding object from the object registry after its expiry time; and removing each object from the cache after its expiry time.

In the method described above, the objects are summarized in a hits distribution list according to a corresponding number of requests (hits) received by each object, and the adaptive hit threshold HT is periodically adjusted so that objects with the most hits are preferably cached.

For example, the adaptive hit threshold HT is adjusted periodically by a correction amount computed as a function of an actual cache usage C_tot, the cache size threshold C_S, and an expected increase in cache usage C_incr.

In one of the embodiments of the invention, the expected increase in cache usage C_incr is computed as a ratio of a periodic time update interval and an average time to live of all objects, C_incr being further proportional to the cache size threshold; and the actual cache usage comprises a sum of all objects that were cached since a startup_ when the cache was empty, minus a sum of all objects that have been removed from the cache since the startup.

For example, the expected increase in cache usage C_incr may be determined as a function of an average time to live (TTL_avg) of the objects.

In the method described above, the determining the hit threshold HT comprises:

recording a size of each of the objects;

generating a hits distribution array comprising:

indexing the hits distribution array by an index representing a number of requests received;

storing at each indexed location of the hits distribution array a size sum of sizes of all objects having received the number of requests corresponding to the index; and selecting as the hit threshold HT the highest index above which a sum of the size sums does not exceed the predetermined capacity of the cache.

Provided the objects are out of band (OOB) objects available from a source, the method further comprises:

adapting an object into an adapted object according to a destination profile; and obtaining the object to be adapted from the cache provided the object was cached, otherwise obtaining the object from the source before adapting the object.

The method further comprises:

determining an average bandwidth saving factor (ABS), the ABS being a function of the sizes of all cached adapted objects which were adapted according to the same destination profile and the sizes of the OOB objects from which they were adapted;

computing a normalized hit threshold HT_TN as a function of the hit threshold HT and the ABS according to the destination profile;

caching the adapted object provided the number of requests for the requested object to be adapted exceeds the normalized hit threshold HT_TN.

In one embodiment of the method described above, computing the normalized hit threshold HT_TN comprises multiplying the hit threshold HT with the ABS.

According to yet another aspect of the invention, there is provided a method for managing caching of objects, comprising:

receiving a request for an object having a predetermined expiry time;

obtaining the object from a media source provided the object is not cached;

caching the object after receiving an Nth request for the object, N being greater than a dynamically adjusted threshold HT;

dynamically adjusting the threshold HT as a function of available cache space; and removing the object from the cache after its expiry time has passed provided the object was cached, thereby making space available in the cache.

In the method described above, the dynamically adjusting further comprises adjusting the threshold HT as a function of an actual total cache usage compared to an expected cache usage increase.

In the method described above, the dynamically adjusting the hit threshold HT further comprises:

recording a size of each object being requested;

generating a hits distribution array;

indexing the hits distribution array by a number of requests received;

storing at each indexed location of the hits distribution array a size sum of sizes of all objects having received the number of requests corresponding to the index; and selecting as the threshold HT the highest index above which a sum of the size sums does not exceed the capacity of the cache.

Assuming that objects are out of band objects available from a source, the method further comprises:

adapting the object into an adapted object according to a destination profile;

obtaining the object to be adapted from the cache provided the object was cached, otherwise obtaining the object from the source before adapting the object.

The method further comprises:

determining an average bandwidth saving factor (ABS) corresponding the destination profile;

computing a normalized hit threshold HT_TN by multiplying HT with the ABS;

caching the adapted object provided the number of requests for the requested object to be adapted exceeds the normalized hit threshold HT_TN.

In one of the embodiments of the invention, the ABS is computed by dividing a sum of the sizes of other adapted objects adapted according to the destination profile by a sum of the sizes other objects the other adapted objects were adapted from.

In the method described above, the other adapted objects are cached adapted objects, and the ABS is 1.0 when none of the other adapted objects are cached adapted objects.

According to yet one more aspect of the invention, there is provided a media adaptation server comprising a self-tuning cache management sub system for processing requests for caching objects in a media cache, the system comprising:

a processor, and a non-transitory computer readable storage medium having computer readable instructions stored thereon for execution by the processor, forming:

a caching control module comprising executable instructions for determining caching of objects, and operating in combination with data structures, the caching control module comprising:

an object registry for identifying and registering objects;

a hit buckets array of hit buckets for storing accumulated sizes of registered objects, and indexed by a hit number which corresponds to a number of requests (hits) each registered object has received;

a hit threshold register for storing an adaptively determined hit threshold (HT) specifying a minimum number of hits after which an object is cached;

a time-to-live (TTL) window list for storing expiry times of respective registered objects; and a timer for determining an occurrence of times for removing registered objects from the object registry and from the cache.

In the media adaptation server described above, each hit bucket of the hit buckets array is used to store a sum of sizes of only those registered objects which have received the number of hits, the number of hits being the value of the index of the corresponding hit bucket.

In the media adaptation server, the hit threshold HT is determined by:

successively indexing the hit buckets array starting at the highest index;

summing contents of the indexed hit buckets until a predetermined cache size threshold is exceeded; and setting the hit threshold HT to the last index.

In the media adaptation server, the TTL window is divided into a number of TTL buckets, each TTL bucket covering a predetermined time span for storing object descriptors of registered objects whose TTL expires in said time span.

In the media adaptation server, the predetermined time span corresponds to an update interval T_upd used in a periodic updating of the hit threshold (HT).

The media adaptation server further comprises a terminal profiles database, and an adaptation engine for adapting registered objects into adapted objects for transmission to media clients, the adaptation for each media client being performed according to a terminal profile stored in the terminal profiles database.

In the media adaptation server described above, the caching control module further comprises executable instructions for determining a normalized hit threshold HT_TN for caching adapted objects, the normalized hit threshold HT_TN being computed by proportionately reducing the hit threshold HT according to an average size reduction of adapted objects with respect to the size of respective registered objects from which they were adapted.

For example, the normalized hit threshold HT_TN is computed by taking into account only registered objects and adapted objects that are already cached.

Conveniently, the normalized hit threshold HT_TN is specific to each terminal profile.

According to yet one more aspect of the invention, there is provided a self-tuning cache management system for processing requests for caching objects in a media cache, the system comprising:

a non-transitory computer readable storage medium having computer readable instructions stored thereon for execution by a processor, causing the processor to perform functions of:

registering requested objects upon respective first requests for the requested objects in an object registry, including a time to live (TTL) for each requested object;

accumulating an object size of each requested object in hit buckets according to a number of requests received for said each requested object;

storing a hit threshold (HT) in a hit threshold register, the HT determining a minimum number of requests any of the requested object must have before the requested object is cached;

adjusting the HT periodically according to a cache fill;

listing the requested objects in a TTL window according to respective expiry times according to the TTL of said requested object; and periodically scanning the TTL window and removing requested objects from the object registry when the requested objects are expired, furthermore removing the requested objects from the cache provided the requested objects had been cached.

There is also provided a a media adaptation server comprising the processor, and the self-tuning cache management system described above.

Thus, an improved method and system for self-tuning cache management have been provided.

BRIEF DESCRIPTION OF THE DRAWINGS

Embodiments of the invention will now be described, by way of example, with reference to the accompanying drawings in which.

DETAILED DESCRIPTION OF THE EMBODIMENTS OF THE INVENTION

Embodiments of the present invention provide a cache management method which aims to provide caching of web objects, managed according to their probability of being requested multiple times from the cache, thereby utilizing the cache capacity more effectively.

The present invention takes into account the following elements associated with the caching of media files, and web objects (or simply "objects") in general:

the fact that some media files are requested more frequently, than others; and the life time of media files is purposely limited.

Given that total cache memory capacity is limited, it therefore makes sense to (a) reserve available cache space for storing the more frequently requested objects rather than the less frequently requested objects, and (b) to evict expired objects from the cache.

The first objective (a) is achieved in the embodiments of the invention by delaying the caching of any object until the number of requests for the object (a request is also commonly referred to as a "hit") have exceeded a certain threshold of hits, the threshold being dynamically adjusted as a function of cache space available.

The second objective (b) is achieved by organizing storage of references to all active objects according to their respective expiry times, such that an efficient eviction of all expired objects from the cache is facilitated.

Figure 2:
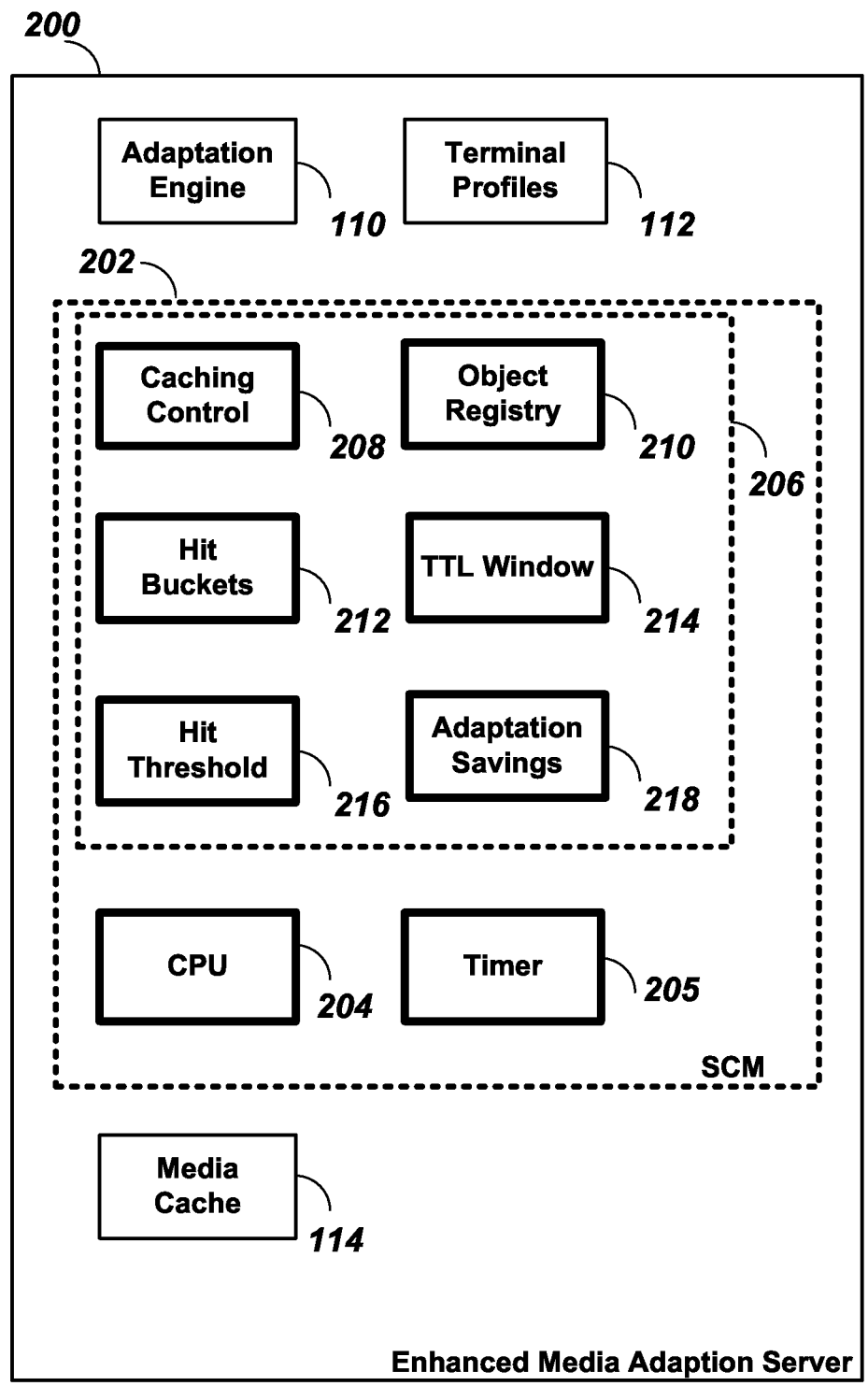
FIG. 2 shows an enhanced media adaptation server 200 according to an embodiment of the present invention.

FIG. 2 shows an enhanced media adaptation server computer 200 according to an embodiment of the present invention, including a self-tuning cache management module (SCM) 202 in addition to the adaptation engine 110, the terminal profile database 112, and the Media Cache (also referred as "the cache") 114.

While the SCM 202 will be described in the context of the enhanced media adaptation server 200 in conjunction with the media cache 114, it is noted that SCM 202 itself may be used generally for optimizing the caching of objects in any cache, where each of these objects have, or can be assigned, a defined life time attribute, and where the objects are cached to be subsequently read from the cache at least a few times during the life time of each respective object.

The self-tuning cache management module, or manager, 202 comprises a processor, or central processing unit (CPU) 204, a timer 205 and a non-transitory computer readable storage medium, for example memory 206, wherein are stored: a caching control module 208; an object registry 210; a Hit Bucket array 212, also referred to as Hits Distribution list 212; a time-to-live (TTL) window array 214; a Hit Threshold Register 216; and an Adaptation Savings array 218.

In one implementation, the self-tuning cache management module (SCM) 202 is a computer system wherein the CPU 204 executes instructions of the caching control module 208 stored in the memory 206, to perform the functions of the SCM 202, including operations on data stored in the object registry 210, the Hit Bucket array 212, the time-to-live (TTL) window array 214, the Hit Threshold Register 216, and the Adaptation Savings array 218.

In another implementation, the SCM 202 may be implemented as software only to comprise the software modules and blocks 208-218 stored in the memory 206, i.e. may exclude the CPU 204 and the timer 205 as part of the SCM 202, which instead may be part of the adaptation server computer 200, wherein the software instructions stored in the memory 206 cause the processor 204 to perform the functionality of the modules and software blocks 208-218 described above.

For the convenience of the reader, a glossary of terms and abbreviations is provided below.

Glossary

Note: objects registered and possibly cached are typically "media" in the exemplary embodiments described. The more general term "object" may also be used instead, and both terms will be used interchangeably.

OOB Out-Of-Band

TPS Transaction Per Second

TTL Time To Live of an object. The TTL of an object may be derived from a HTTP "expires" field or, if absent, a default TTL value is substituted. Every object has a TTL, which is established when the object is first registered in the SCM. When the TTL of an object expires, the object expires and is removed from the registry as well as the cache if it was cached. If the object is subsequently received (obtained from the source) again, and registered again, a new TTL value is set for the object.

TTL_max The configurable maximum TTL of any registered objects. It overrides any "expire" field from the HTTP if the HTTP field is present and greater than TTL_max. It is also the default value when the HTTP "expire" field is absent.

TTL_avg Average expiration time over all registered objects, recomputed each time an object is added to or removed from the registry.

Convergence Phase A startup process when caching of objects is begun.

Plateau Phase A normal operational phase after the Convergence Phase has ended.

C_FR Cache Filling Rate: used in the Convergence Phase to estimate the end of the Convergence Phase.

C_S Cache Size Threshold: a configured value less than 100% of the physical cache capacity, representing a target limit for cache fill in the Plateau Phase.

C_conv Targeted cache fill during the Convergence Phase, which rises from 0 to C_S with time.

T_conv Time elapsed since the start of the Convergence Phase.

HT Hits Threshold: the number of hits that a registered object must have received before it is cached, for instance if HT=3, the object will only be cached on the 4th hit.

HT-Update-Interval A configurable recurring time interval, after which HT is updated.

OOB object An out-of-band object, such as a media file received from the media source 102.

C_tot Total cache usage (usage=fill) which includes cached OOB objects plus cached adapted (i.e. transcoded and transrated) versions. C_tot is used to describe the amount of bytes cached, computed by summing the sizes of objects cached.

C_OOBconv Target of cache usage for OOB objects, not including adapted versions, during the Convergence Phase.

T_upd Cache update interval, equal to to the HT-Update-Interval.

C_incr Expected cache fill increase between updates of HT. C_incr does not reflect the change in occupancy because it does not include expired objects, only added objects.

HT_cor HT correction: an integer amount by which HT is increased or decreased at each update interval.

C_plat Cache size threshold during the Plateau Phase, equal to C_S.

C_OOBplat Target of cache usage for OOB objects, not including adapted versions, during the Plateau Phase.

SB Saved bandwidth: SB is the difference in size between a cached adapted object and its original (or source) version. SB is a characteristic of the cached adapted object. For example if a cached adapted object is the source media itself, then SB is 0. If the cached adapted object is a transcoded version of size 100 MB and the source was 150 MB, then SB is 50 MB.

P_i Profile of a destination type "i" for which adaptation (transcoding only) of the object is performed.

ABS_i Average bandwidth saving factor for a given profile P_i.

HT_TN Hit Threshold for adapted media, normalized for each profile P_i.

TTL_Window A list of references to all non-expired objects in the cache, roughly or exactly in the order of their expiration time.

TTL_bucket In the preferred embodiment, the TTL_Window is a circular array of TTL buckets of limited size.

TTL_bucket_size Time span covered by the expiration times of objects referenced in a single TTL bucket, equivalent to one HT-Update-Interval.

The object registry 210 is used to store an object information record for every OOB object requested, the object information record being created when the OOB object is first requested. The object information record is deleted when the corresponding object expires, whether it was cached or not. The time-to-live (TTL) window array 214 is used to enable efficient deletion of objects according to embodiments of the invention. The Hit Bucket array 212 in which the hits distribution is recorded, and the Hit Threshold Register 216, are used in the management of caching objects in general, while the Adaptation Savings array 218 is used in the management of caching adapted objects according to embodiments of the invention.

Theory of Operation

Figure 3:
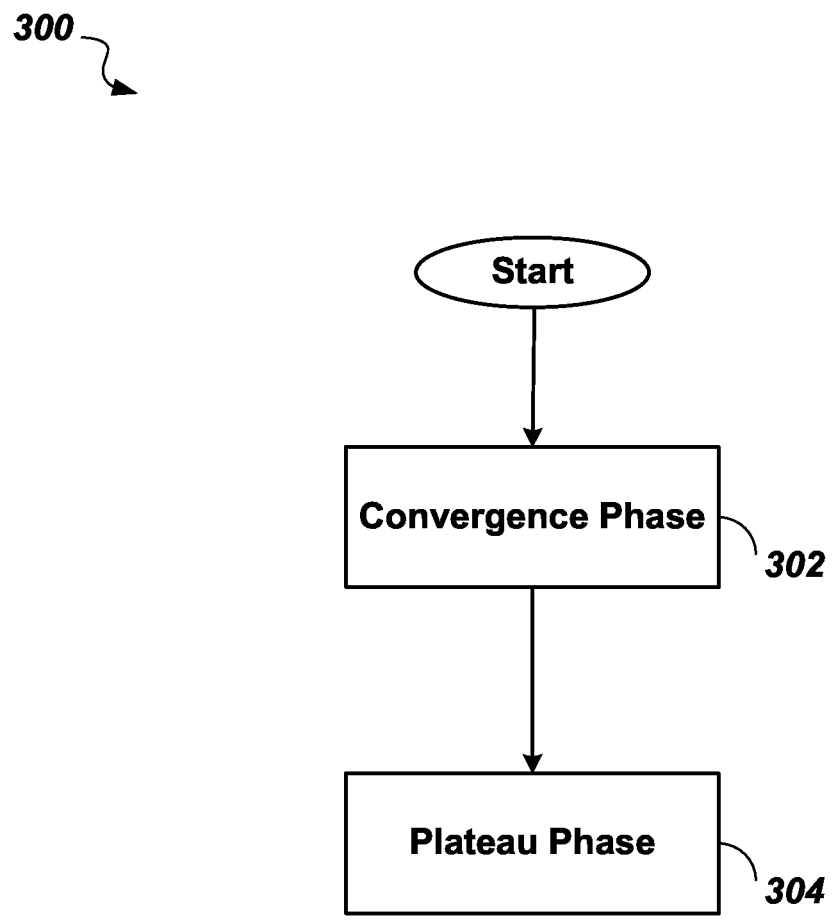
FIG. 3 shows a functional diagram 300 in which the operation of the SCM 202 is summarized, including a Convergence Phase 302 and a Plateau Phase 304 according to an embodiment of the present invention.

FIG. 3 shows a functional diagram 300 in which the operation of the SCM 202 is summarized, including a Convergence Phase 302 and a Plateau Phase 304.

The caching conditions are split into two successive phases: the convergence phase 302 and the plateau phase 304. While the SCM 202 is in the convergence phase 302, the media cache 114 is gradually filled by the most popular media objects and their different dependent versions. At the end of the convergence phase 302, the media cache 114 is nominally full. When the plateau phase 304 starts expired media objects will have been removed from the cache and replaced by new objects.

The duration of the convergence phase 302 is chosen carefully to make sure that objects indeed start to expire by the end of the convergence phase 302. On the other hand, the plateau phase 304 is designed to run in a continuously self-adjusting equilibrium of caching objects and deleting expired objects. The release of expired objects and their removal from the SCM 202, and from the cache 114 in particular, will be described further below.

In both the Convergence Phase 302 and the Plateau Phase 304, the SCM 202 receives caching requests for objects which may be Out-Of-Band (OOB) Objects, i.e. original objects sent from the media source 102, or they may be adapted objects sent from the Adaptation Engine 110 to the SCM 202. In either case, the caching requests may typically result from media requests received by the enhanced media adaptation server 200 from any of the Media Clients 104. The enhanced media adaptation server 200 may satisfy such media requests directly if the appropriate OOB or adapted object is already cached, and if necessary adapt the OOB object into an adapted (transcoded or transrated) object for transmission to the requesting Media Client 104 as is common practice for example in the media adaptation server 106 of the prior art.

In addition, the SCM 202 will record all caching requests, and cache OOB or adapted objects only in accordance with an innovative caching policy, an embodiment of which is described in detail below.

Because adapted versions of an object are always dependent on an OOB object, adapted versions may also be referred to as "dependent objects", and the associated OOB object will also be referred to as the "parent object". The OOB objects and dependent objects may or may not be cached, but the dependent objects are never cached unless their parent object is also cached.

Convergence Phase Behaviour

During the convergence phase 302 the SCM 202 gradually fills the cache 114, the biggest challenge being to fill the cache 114 completely by the end of that phase with only the most popular media.

The convergence duration is designed to be long enough to allow the earliest cached media object to expire. Hence the SCM 202 uses an expiration time for each registered media to compute the duration of the convergence phase 302. A registered object (registered in the object registry 210), is an object associated to a caching request received by the SCM 202, and which is still valid, valid in the sense that it has not already expired. A registered object may or not be cached. For the purpose of deriving a target duration of the convergence phase 302, one may use the average expiration time taken over all registered objects, denoted TTL_avg.

Hence the convergence phase 302 lasts TTL_avg and when it is complete the cache 114 should ideally be "full". This allows computing a cache filling rate:

$$C\_FR = C\_S / TTL\_avg$$

Where C_FR is the cache filling rate and C_S is a cache size threshold, which represents a fraction of the total cache size (cache capacity) allowed by the configuration of the cache 114. This fraction of the total cache size is itself configurable. The reason, C_S should be less than the cache capacity, is to allow the cache self-tuning process to converge to a cache usage and then oscillate around it.

The cache filling rate C_FR is a target designed to neither underflow nor overflow the cache 114. From this rate one can then compute a target cache fill at any time during the convergence phase:

$$C\_conv = C\_FR * T\_conv$$

where C_conv is the targeted cache fill and T_conv is the time elapsed since the beginning of the convergence phase 302. In these computations, it is assumed as a simplification, that the variation of the rate at which objects are registered, or TPS (transactions per second), is negligible.

Hits Distribution List

Although the preceding paragraph describes a reasonable way to compute the desired cache usage at any time during the convergence phase 302, it is also necessary, according to the concepts of the invention, to enforce the caching of the more popular objects over less popular objects.

If the SCM 202 had unlimited CPU power, one could theoretically create a hit-ordered list of all objects based on the number of times these objects were requested (or hit). The SCM 202 would then scan this list from the most popular to the least popular object and the most popular objects would be cached until the sum of their sizes reaches the targeted cache fill C_conv. This list would have to be updated every time a new request comes in, in order to move the requested object higher in the list, verifying if it passes the last (least popular) of the cached objects and potentially replacing it in the cache if the cache overflows. Overflowing the cache means in this case, the current cache usage would exceed the computed target cache usage C_conv.

Such a text-book implementation however, would be very CPU intensive when a high rate of requests (TPS) occurs. To avoid this problem, the SCM 202 uses buckets indexed by the number of hits (hit buckets) and accumulate in hit bucket N the size of all objects that have been requested N times. When the SCM 202 receives the Nth request for an object, its size is removed from hit bucket N−1 and added to hit bucket N. The hit buckets are ordered from highest index to lowest index and stored as an ordered hits distribution list.

Alternatively, the hits distribution list may be implemented as an indexed array, stored in the Hit Bucket array 212 of FIG. 2, which is described in more detail in FIG. 3A below. Because all objects will eventually expire, and their sizes eventually removed from their respective hit buckets, both the necessary number of hit buckets as well as their individual capacity are bounded.

The Hit Bucket array 212 is scanned from highest index N to lowest index and the accumulated object sizes stored in each bucket are summed, until the size sum is greater than the targeted cache usage C_conv. If the last bucket included in the size sum has index M, then every registered media requested more than M times can be cached without overflowing the cache. Hence this implementation insures that only the most popular are cached and the cache is completely, or nearly completely, filled. For the remainder of the description, this threshold index M will be referred to as a hit threshold (HT).

Cache Usage for Out-of-Band Versus Adapted Objects

The previous section only covers the caching of OOB objects, for example objects received from a media source 102 to be cached and compressed (adapted) eventually. In the SCM 202, the same media cache 114 is used for caching the OOB objects and adapted objects each of which depends from an OOB object. Hence if an OOB version is cached when it has been requested more than HT times, the same could and should apply for dependent objects.

This consideration affects the computation of HT, if the hits distribution list only stores the OOB version size but the cache may contain both the OOB version and dependent (adapted) versions. Hence, using the HT criterion as computed in the previous section could fail because the cache could overflow since more versions will be cached than intended.

Consequently, although the sizes of adapted objects should be taken into account in the hits distribution, it is not possible to know these sizes at OOB object registration time, i.e. before any adaptation of the OOB object takes place. On the other hand we know how many OOB object bytes are cached relative to the sizes of corresponding dependent objects which it is desired to cache also. Using a proportionality rule we can recompute a targeted OOB cache usage at any point of the convergence phase:

$$C\_OOBconv = C\_conv * (C\_OOB / C\_tot)$$

where C_OOB is the size of the already cached OOB objects and C_tot is the total cache usage which includes the sizes of all OOB and dependent objects (e.g. transrated and transcoded media) that have been cached so far. Using this C_OOBconv value as a target cache fill during the Convergence Phase 302, instead of C_conv alone, one can confidently compute HT as described above.

Real-Time Adaptation of the Caching Criterion

As described above, the caching criterion, i.e. the hits threshold HT, is only strictly valid when the rate variation of caching requests (TPS) is negligible. In a real deployment that will not the case and it is necessary to correct HT as the TPS evolves. When the TPS increases (or decreases), the caching rate is greater (smaller) than C_FR, the cache filling rate during the convergence phase. As a consequence the cache could overflow (underflow) and it will become necessary to increase (decrease) the hits threshold HT to admit less (more) media in cache. Although this strategy is clear in principle, its quantification is not obvious: how much should HT be increased or decreased as the case may be?

In order to estimate an HT correction, we propose the following: Although the hit distribution implementation itself is economical, it is not efficient or practical, to recompute HT for every received caching requests. As consequence, a periodic ht-update interval is proposed that results in a configurable refresh rate for HT. The ht-update interval will be simply referred to as a cache update interval T_upd.

Between each HT update during convergence phase, the cache usage increase is equal to:

$$C\_incr = C\_S * (T\_upd / TTL\_avg)$$

Where C_incr is a proportional measure of the cache increase between updates, C_S is the cache size threshold and T_upd is the cache update interval. TTL_avg is the average time to live of all registered objects, and is used to define the duration of the convergence phase 302: after TTLavg, the cache is expected to be full. With these parameters, a HT correction may be computed as:

$$HT\_cor = IntegerRound((C\_tot - C\_conv) / C\_incr)$$

Where HT_cor is the HT correction used for incrementing HT. C_tot is the total cache usage at update time and C_conv is the targeted cache usage at update time.

This correction is reasonable as it is proportional to the difference between the targeted and the current cache usage. Furthermore, small variations in cache usage between updates are accepted without correction as there will be time to react again at the next update time.

The method for periodically adapting the hits threshold HT to the actual cache usage, is used in both the, convergence phase 302 and the plateau phase 304.

The convergence phase starts with the first request received by the SCM 202. At the same time HT is first updated and set to 2, its start-up value. It will remain 2 until the second HT update, an HT-Update-Interval later. This may seem unwanted behaviour as this could allow the caching of objects that may not turn out to be popular enough. On the other hand, the ratio (C_OOB/C_tot) will be more meaningful from the second update interval on. Simulation tests have shown that HT rapidly converges to a stable value, and that only a small number of less popular objects are cached at the start of the Convergence Phase 302. These objects are also likely the first ones to expire and to be removed from the cache.

Plateau Phase Behaviour

The convergence phase 302 ends after TTL_avg and the plateau phase 304 starts. At that point the cache is full and cache recycling has already started since some objects have a smaller TTL than TTL_avg and have already expired.

In the plateau phase, the targeted cache usage, C_plat, is simply C_S, the cache size threshold, and the targeted OOB cache usage is $$C\_OOBplat = C\_S * (C\_OOB / C\_tot)$$

To compute HT in the plateau phase 304, C_OOBplat is used in the same way as C_OOBconv was used to compute HT in the convergence phase 302.

The same rationale for the HT correction continues to apply in the plateau phase 304 as during convergence phase 302:

$$HT\_cor = IntegerRound((C\_tot - C\_S) / C\_incr)$$

The term C_incr refers to an artificial number, which describes the net expected amount of object arrivals in terms of their size during one update interval, and is a true increase in cache "occupancy" only during the Convergence Phase, and before objects actually expire and are removed from the cache. But the same number is also used in the Plateau Phase where, as shown in the formulas, it works exactly the same way. But in a stable system of course, there is normally no net increase in cache occupancy, i.e. when newly cached objects are balanced with expiring objects in the same time period. In the Plateau phase, C_incr (which can be also referred to as arriving object volume C_arr) really means just an assumed or expected amount of objects, i.e. their volume measured in bytes, arriving into the cache. But the same number, more or less, of other objects expire by their TTL in the same time interval, and are removed from the cache. So at equilibrium, there is no net increase in cache "occupancy", and HT stays the same when the expected amount of cached arrival bytes (C_incr or C_arr) is more or less balanced by the volume of bytes in objects that are removed from the cache in the same time (departed object volume C_dep). Accordingly, HT increases (or decreases) when there is more (or less) arriving object volume than departing object volume in an update interval, as described above. In summary, in the Convergence Phase, the cache grows until it is "full", but in the Plateau phase it stays full, by exactly the same mechanism.

In other words, C_incr is computed during the Convergence phase, and the number obtained is also used in Plateau phase even though the same the same name has been kept in the Plateau phase. The physical meaning of C_incr is that it determines the reactivity of the method to non-negligible TPS variation and in this sense it applies equally to both the Convergence and Plateau phases. C_incr is not used as is but divides the difference between the actual cache usage and the targeted cache usage, this difference being proportional to the TPS variation. Under large C_incr (large update interval) the HT will vary slowly, damping the TPS variation. Under small C_incr the HT will vary rapidly following more closely the TPS variation.

Hit Bucket Design

Each unique requested object is registered in an OOB object record in the Object Registry 210, and repeated requests ("hits") for the same object are counted in the OOB object record associated with the object. When objects are requested, they are identified with a unique object identifier.

Every adapted object is associated with its parent OOB object in the Object Registry 210, from which it is generated by transcoding (transforming an object encoding format to a particular encoding format used by the destination), transrating (recoding of an object to a lower bitrate without changing the format), compression, or some other form of conversion. A media request frequently identifies an OOB object, which then requires transcoding or transrating according to a terminal profile that is specific to the terminal used by the requesting media client. The terminal profiles are stored in the terminal profile database 112 of the terminal profile database 112.

Only OOB objects have an object record entry in the Object Registry 210. Hits to all adapted objects are registered as dependent objects in the parent OOB object record. Most OOB objects arrive in the SCM with a Time-To-Live (TTL) attribute which implies an absolute expiry time. A configurable default TTL is assigned to every OOB object that arrives without a TTL already specified in the request. As soon as the expiry time of an OOB object occurs or shortly thereafter, the OOB object and all its associated dependent objects are removed from the Object Registry 210, and from the cache if they were cached. It is as if the objects never existed. If the same object is requested again at a later time, it will be registered as a new object, and possibly adapted or cached.

The Hit Bucket Array 212 is used to manage which objects, OOB objects and dependent objects, are cached, while the TTL_Window 214 is used to manage the expiry of each OOB object, according to its TTL, regardless of whether it was cached or not. Any dependent objects that were cached are also removed from the cache when the parent OOB object expires.

Figure 3A:
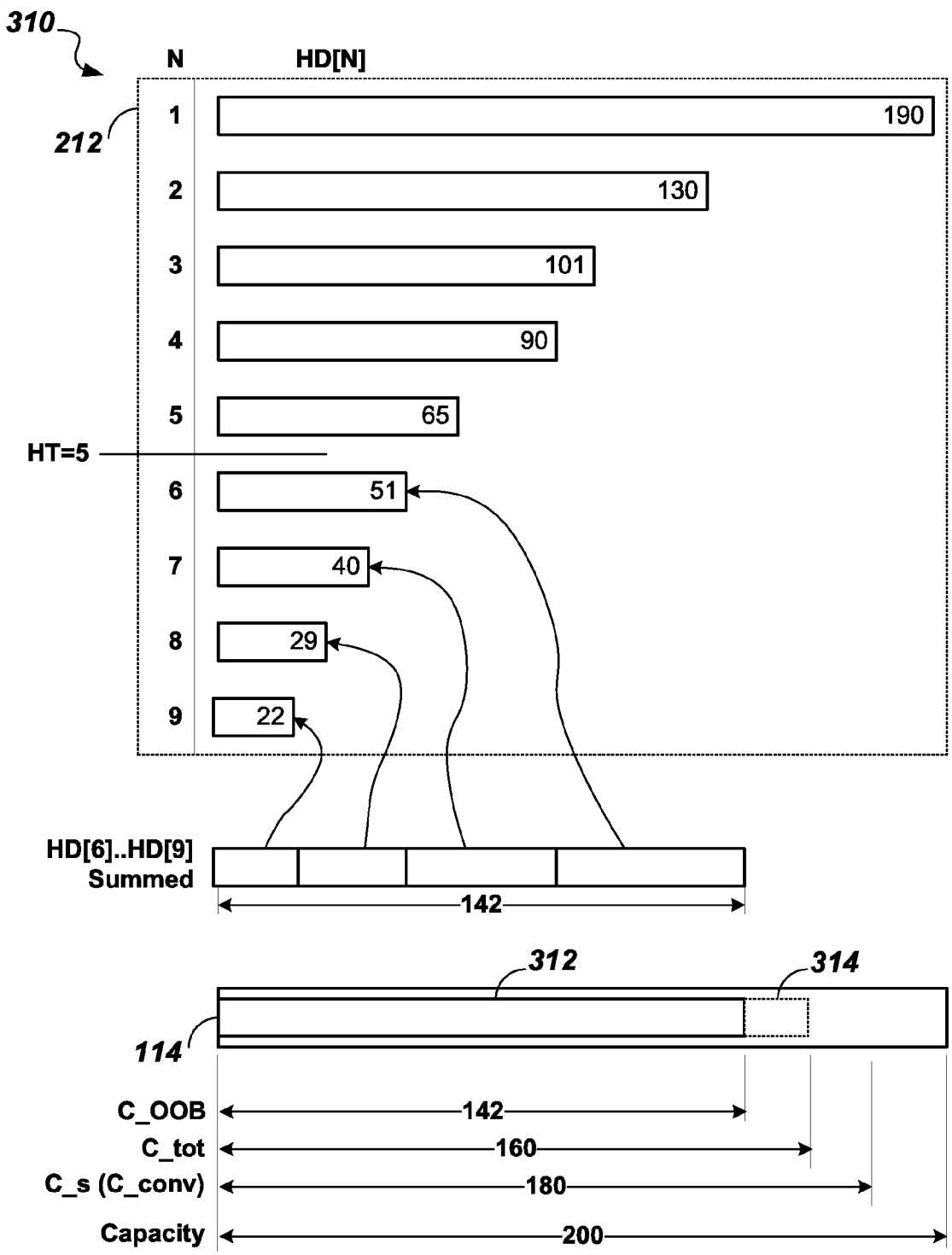
FIG. 3A shows a graphical illustration 310 of the concept of managing cache insertions with the help of the Hit Bucket Array 212 of FIG. 2 according to an embodiment of the present invention.

FIG. 3A shows a graphical illustration 310 of the concept of managing cache insertions with the help of the Hit Bucket Array 212. This concept applies to both the Convergence Phase 302 and the plateau phase 304. FIG. 3A illustrates in a histogram an exemplary state of the Hit Bucket Array 212, showing index "N", N=1 . . . 9, and illustrative contents (in MegaBytes) of each Hit Bucket HD[N], which are shown as blocks whose size illustrates to the value of hit bucket HD[N]. The value of each HD[N] is the sum of all OOB object sizes currently registered in the object registry 210 that have received exactly N hits.

Nine (9 hits) is shown in FIG. 3A as the highest number of hits of any object at some point in time when HT is updated. The range covered by the Hit Bucket Array 212 is automatically extends to the highest number of hits experienced by any object that is still registered and not yet expired.

The example illustration is reduced in scale for clarity, with N_max=9, and individual HD[N] values ranging from HD[1]=190 MB down to HD[8]=22 MB, and HD[9]=22 MB. The hit threshold HT (HT=5 in FIG. 3A) divides the hit buckets two ranges. Only OOB objects with more than HT hits will be cached, thereby achieving the objective of caching the more popular OOB objects in the available cache space.

The sum of the sizes of HD[6] to HD[9], i.e. the sizes of OOB objects in hit buckets above HT, is shown as a block of 142 MB.

The Cache 114 is also shown diagrammatically in FIG. 3A, as a block representing an example capacity of 200 MB. The cache 114 holds (at this point, in this example) an OOB objects block 312 of OOB objects totaling 142 MB and, shown in dotted outline, a dependent objects block 314 of 22 MB, that is C_tot–C_OOB.

Below the block of the Cache 114 are illustrated numerical examples of:

C_s of 180 MB, which is the configured cache size threshold, a configured value less than 100% of the cache capacity, representing a target limit for cache fill in the Plateau Phase, (the proportionally growing target cache usage C_conv plays the same role in the Convergence Phase);

C_tot of 160 MB, which is the current total cache fill including all cached OOB objects as well as any cached dependent objects; and C_OOB of 142 MB, which is the sum of the OOB objects whose sizes are recorded in the hit buckets HD[6] to HD[9], i.e. the hit buckets with an index above the hit threshold HT.

The value of C_OOB in the example of FIG. 3A, illustrates that the sum of the OOB objects of hit buckets with index above the hit threshold HT fit within the target cache size. An addition of the 65 MB of the OOB objects from the hit bucket HD[5], just below HT would not fit in the cache 114.

On the other hand, the sizes of dependent objects (which are always adapted versions of OOB objects that are already registered) are not captured in the object size accounting provided by the hit buckets. The total size of all cached items C_tot however does include the dependent objects. In the example of FIG. 3A, the value of C_tot amounts to 160 MB, still within the target limit of C_s of 180 MB.

Managing Cached Media Expiration with a TTL Window 214

The caching criteria self-tuning implementation depends heavily on the fact that objects are removed expediently from the cache. A deterministic way to get rid of the expired media is proposed, based on the TTL window 214.

The TTL window 214 is a TTL-ordered container for all non-expired objects currently registered in Object Registry 210. Since the TTL window 214 is intended to hold only the non-expired objects, it has a maximum size in terms of time span, named TTL_window_size. As the objects time span is limited by the configurable parameter TTL_max, the TTL window size is fixed throughout and is equal to the configurable TTL_max.

The first time a request for an object is received, its expiration time is computed and a object descriptor (not the object itself) is inserted in the TTL window which may be implemented as a single time-ordered list, at the appropriate location. It would be very time consuming to insert objects, or search for objects, in a single time-ordered list containing all object reference. Instead, according to the preferred embodiment of the invention, the TTL window 214 is realised in the form of TTL_buckets, and the object descriptors are stored in the TTL_buckets, where each TTL_bucket covers a fixed shorter time period: TTL_bucket_size. Note that the TTL_buckets are not TTL-ordered containers of object descriptors but that that the TTL-buckets themselves are TTL-ordered within the TTL window.

The TTL window 214 may be implemented as a circular array of TTL_buckets with a number of W=(TTL_window_size/TTL_bucket_size) TTL_buckets in the TTL window 214.

Furthermore, it will be natural as we will see later to define the HT-Update-Interval to cover the same short time period as the TTL_bucket_size.

Each TTL bucket may contain a doubly linked list of object descriptors, which contain the object information. When first registered, each object descriptor is added to a TTL bucket whose time span overlaps with the future expiry time of the object. The TTL bucket position in the TTL window, or more simply the TTL Bucket index in which the object descriptor will be inserted is computed using the object TTL and registration time:

index=((Registration Time+TTL)MODULO TTL_window_size)/TTL_bucket_size.

When a TTL bucket expires, which means that its entire time span is later than the current time, the TTL bucket list of object descriptors is moved outside the TTL_window into an expired list. The expired list can contain the object descriptors from different TTL buckets and will be processed later for deletion: all the objects referred by the expired list will be deleted from the Object Registry 210 and from the Cache 114.

Having a separate processing thread that monitors the TTL window for expired buckets may be an option. But a preferred method is to only monitor the TTL window when a new object is about to be added to the cache and its reference is added to a TTL bucket.

At that time, it is verified that the expiring list head of the "now" TTL bucket (the TTL bucket at the current TTL index which is equal to ((current_time MODULO TTL_window_size)/TTL_bucket_size), is not expired. If that is the case, then all elements in the list in that TTL bucket have also expired and the entire list of the "now" bucket is removed from the "now" TTL bucket and moved to the expired list, or linked to expired objects already in the expired list. The expired list is emptied when it becomes necessary to insert an object and the cache is nearly full (the cache fill approaches C_S), thereby creating free space in the cache.

It is also necessary to handle appropriately the case where caching events are not frequent, for example when less than one caching request is received per time span covered by one TTL bucket. In this case, it is verified that the expiring list head of the "now" TTL bucket is not expired before linking any newly received object to it.

When a TTL bucket expires, the self-tuning hits distribution list (the Hit Buckets 212) are updated by removing the object sizes of expired objects from the appropriate hit bucket, the one indexed with the OOB media hit count. Because the cleaning of the TTL window 214 has a direct effect on the caching criteria self-tuning, it is natural to set the HT-Update-Interval, which defines the frequency at which the hit threshold HT is updated, to the value of TTL_bucket_size.

Figure 3B:
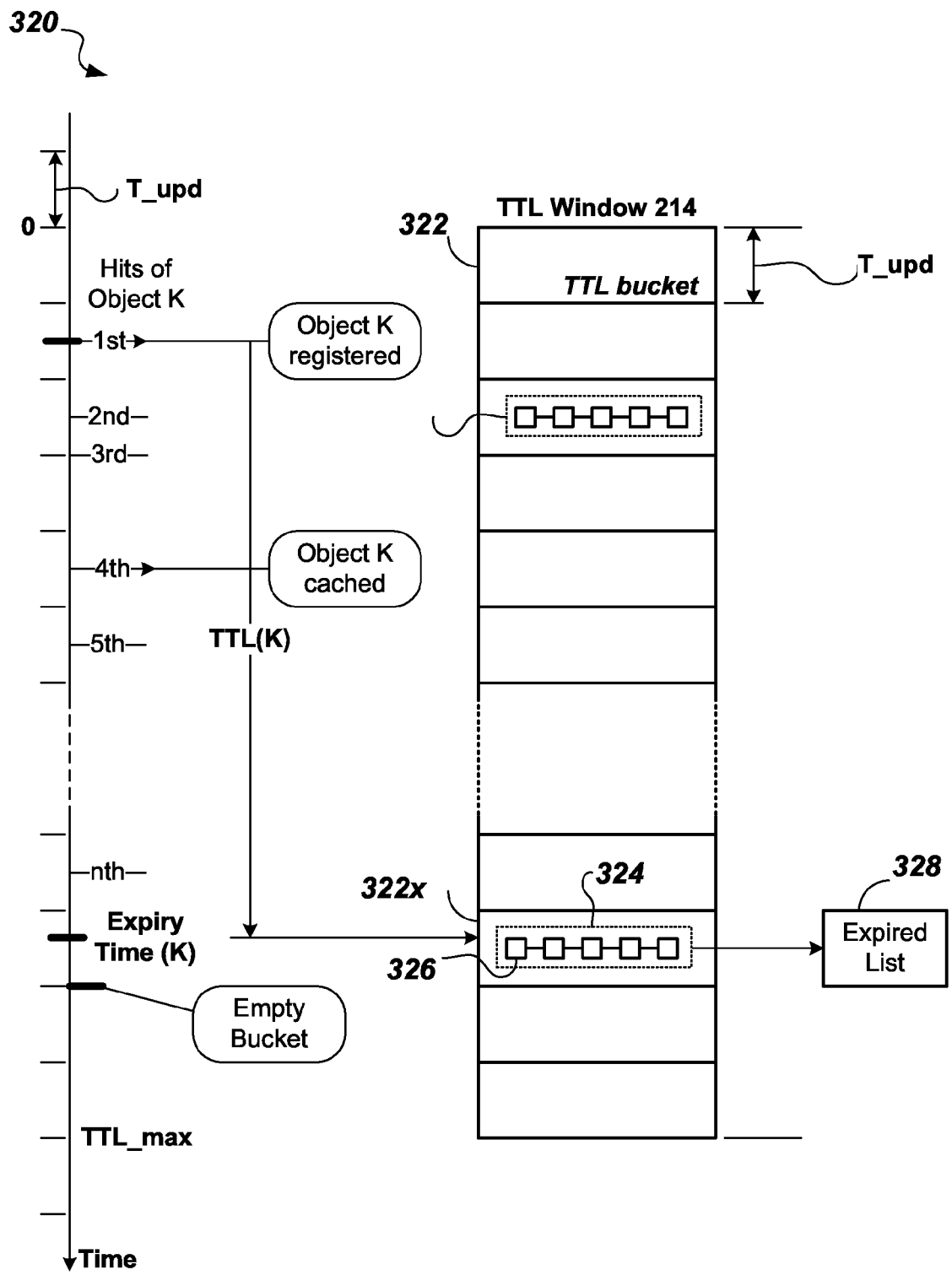
FIG. 3B shows an illustration 320 of a concept of managing the expiry of objects using the TTL Window 214 of FIG. 2 according to an embodiment of the present invention.

FIG. 3B shows an illustration 320 of a concept of managing the expiry of objects using the TTL_Window 214. FIG. 3B shows a vertical time line on the left, marked at intervals corresponding to the cache update interval T_upd. The time span covered in FIG. 3B includes a configured maximum life time TTL_max which will not be exceeded by any object. Also shown is the TTL_Window 214 including one TTL Bucket 322 corresponding to each update interval T_upd. System time starts at 0 when the system is first started, and wraps around after each period of TTL_max by resetting to 0. Each TTL Bucket 322 (only one expiring TTLbucket 322*x* is shown for clarity) may contain a list 324 of all objects which are scheduled to expire immediately after the update interval that corresponds to their expiry times.

FIG. 3B illustrates the life history of an example object "K" which, as indicated along the time line, is registered in the Object Registry 210 when the object first requested (1st). At that time, an expiry time (K) for the object "K" is computed, either from a relative or absolute TTL value obtained in the request, or from the configured default TTL. A node 326 referencing the object "K" is added to the list 324 in the TTL bucket (322*x*) of the update interval into which the expiry time (modulo TTL-max) of the object "K" falls.

Also shown in FIG. 3B is a time at which (in this example) the object "K" is assumed to receive its 4th hit, and may finally be cached, assuming the hits threshold HT=3 at that point in time (see description of hit bucket operation, FIG. 3A above). The object "K" may receive further hits after it is cached, indicated as 5th and nth hits in the diagram of FIG. 3B.

At end of the T_upd interval that corresponds to the TTL bucket 322*x*, the object "K" has expired, along with all other objects in the list 324 of TTL bucket 322*x*. The TTL bucket 322*x* may then be emptied into an Expired List 328 which will be processed to clear all objects contained in the list 324, from the object Registry 210 and, if cached, from the media cache 114. From now on, object "K" has disappeared from the system.

The two phases 302 and 304 shown in the functional diagram 300 are both concerned with tracking caching requests, deciding whether or not to cache an object, and when to remove expired objects from the cache.

The Convergence Phase 302 is only executed once, after a fresh start or a reset of the SCM 202. While the SCM 202 is in the convergence phase 302, the cache is slowly filled by the most popular objects and their different adapted versions. At the end of the convergence phase, the cache is full. When the plateau phase 304 starts, expired objects are removed from the cache and gradually replaced by newly requested objects. The duration of the convergence phase 302, i.e. TTL_avg, is chosen to make sure that objects have indeed started to expire before the plateau phase starts. In the plateau phase 304, additional popular objects are cached while expired objects continue to be removed according to their TTL, thus providing an operational equilibrium in which the cache is kept full (or as full as possible) by tracking all requested objects, and always admitting only the most popular objects to be cached.

Embodiments of the plateau phase 304 and the Convergence Phase 302 are illustrated in flow charts which follow.

Figure 4:
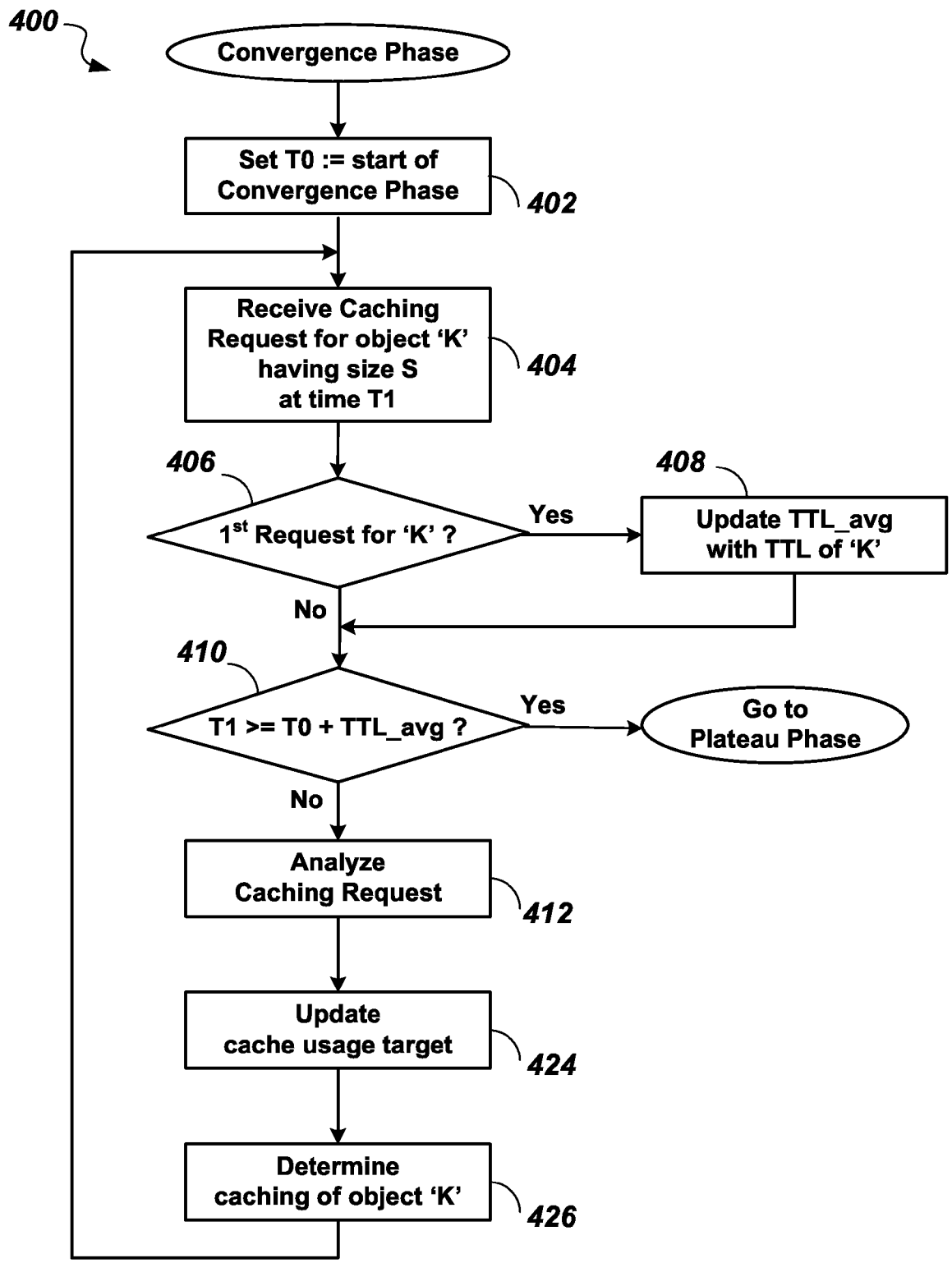
FIG. 4 shows a Convergence Phase function 400 for implementing the Convergence Phase 302 of FIG. 3.

FIG. 4 shows a Convergence Phase function 400 for implementing the Convergence Phase 302, including steps:
402 "Set T0:=start of Convergence Phase";
404 "Receive Caching Request for object 'K', having size 'S', at time T1";
406 "Is 1st Request for 'K'?";
408 "Update TTL_avg with TTL of 'K'";
410 "Is T1>=T0+TTL_avg ?";
412 "Analyze Caching Request";
424 "Update cache usage target";
426 "Determine caching of object 'K'";

In the step 402 "Set T0:=start of Convergence Phase", at the start of the Convergence Phase 302, which starts when the first object request is received in the SCM 202. T0 is set to a predetermined value, for example to the actual time as provided by the Timer 205, or simply to zero.

In the step 404 "Receive Caching Request for object 'K', having size 'S', at time T1", execution waits until a caching request for an object is received. When a caching request for an object is received, the object will be referred to as object 'K'. Subsequent requests may be for the same object or a different object, but each received object is referred to as object 'K' within this function description. The size 'S' of the object, measured in bytes, is recorded, and the current time T1 of the request may also be recorded.

In the step 406 "Is 1st Request for 'K'?", a record R[K] representing the object 'K' is searched in the Object Registry 210, 'K' representing the object identifier of the received object for this example. If R[K] is not found, the object 'K' has never been requested, or possibly had been requested in the past but had already been removed from the object registry because it had expired. In this case of a first request (exit 'Yes' from step 406) the next step 408 is executed, otherwise step 410 is executed.

In the step 408 "Update TTL_avg with TTL of 'K'", the average TTL of all registered objects is updated or effectively recomputed to include the TTL of the newly requested object 'K' in TTL_avg.

In the step 410 "Is T1>=T0+TTL_avg ?", the end of the Convergence Phase 302 is determined by comparing the current time T1 with the average TTL, added to the start time T0. If the Convergence Phase 302 has been active for a period exceeding, or equal to, the average TTL, the Convergence Phase 302 is ended (exit yes from the step 410) and the Plateau Phase begins (see FIG. 6), otherwise execution of the Convergence Phase 302 continues with the step 412.

In the step 412 "Analyze Caching Request", the Object Registry 210 and the Hit Distribution in the form of the Hit Buckets 212 are updated with the requested object 'K'.

Figure 4A:
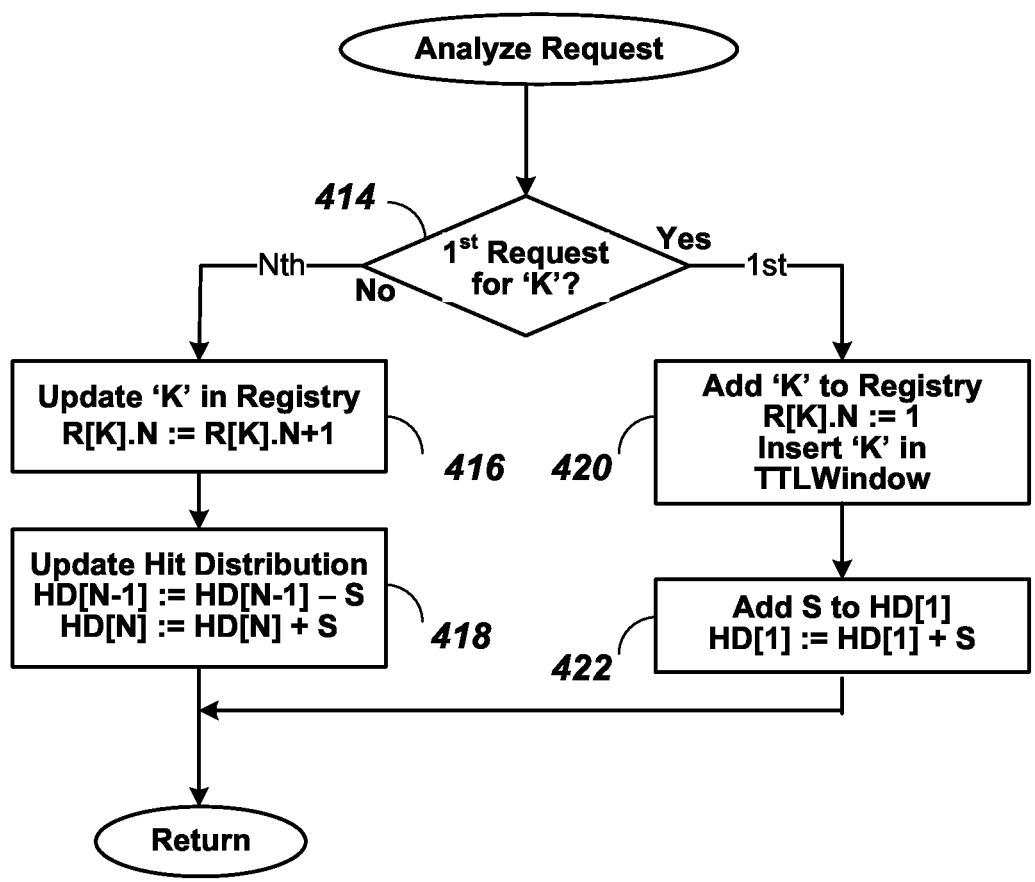
FIG. 4A shows a subroutine for performing the step 412 of FIG. 4.

FIG. 4A shows a subroutine for performing the step 412 "Analyze Caching Request", including steps:
414 "Is 1st Request for 'K'?";
416 "Update 'K' in Registry";
418 "Update Hit Bucket Array";
420 "Add 'K' to Registry"; and
422 "Add 'S' to Hit Bucket [1]".

In the step 414 "Is 1st Request for 'K'?", a record R[K] representing the object 'K' is searched in the Object Registry 210, 'K' representing the object identifier of the received object for this example. If R[K] is not found, the object 'K' has never been requested, or possibly had been requested in the past but had already been removed from the object registry because it had expired. In this case of a first request (exit 'Yes' from step 414) step 420 is executed next, otherwise step 416 is executed.

In the step 416 "Update 'K' in Registry", the hits number N recorded in the object information record R[K] in the Object Registry 210 is updated by incrementing R[K].N.

In the step 418 "Update Hit Distribution", the size 'S' of the object 'K' is subtracted from the hit bucket HD[N−1], and added to the hit bucket HD[N]. After the step 418, the Analyze Request step 412 is complete, and the subroutine "Analyze Caching Request" returns.

In the step 420 "Add 'K' to Registry", the object 'K' is registered, that is:
  a new OOB object record R[K] is created;
  the number of hits for object 'K' in the OOB object record R[K] is set equal to 1;
  an expiry time for 'K' is computed from the TTL of 'K'; and
  a reference to 'K' is inserted in the corresponding TTL bucket of the TTL_Window.

In the step 422 "Add 'S' to Hit Bucket [1]", the size 'S' of the object 'K', having been requested for the first time, is added to the sum of object sizes stored in the Hit Bucket[1]. After the step 422, the subroutine "Analyze Caching Request" returns.

In the step 424 "Update cache usage target" (FIG. 4), the cache usage target C_conv is updated using the following formula:

$$\text{Target } C\_conv := ((T1-T0)/\text{TTL\_avg}) * (\text{Cache size } C\_S),$$

in which C_S, the cache usage target of the Plateau Phase, is scaled down in proportion to the elapsed time (T1) since the start time (T0), relative to the current average TTL of all objects registered so far.

In the step 426 "Determine caching of object 'K'", the hit threshold HT is updated and the object 'K' is cached if it is not already cached, provided its hit count is at least equal to, or exceeds, the hit threshold, and there is space for the object in the cache.

After the step 426, execution of the Convergence Phase function 400 restarts with the step 404, thus forming a loop from the step 404 to the step 426, which continues until the end of the Convergence Phase 302 is reached (as determined in the step 410), at which time execution of the Plateau Phase 304 starts.

Figure 4B:
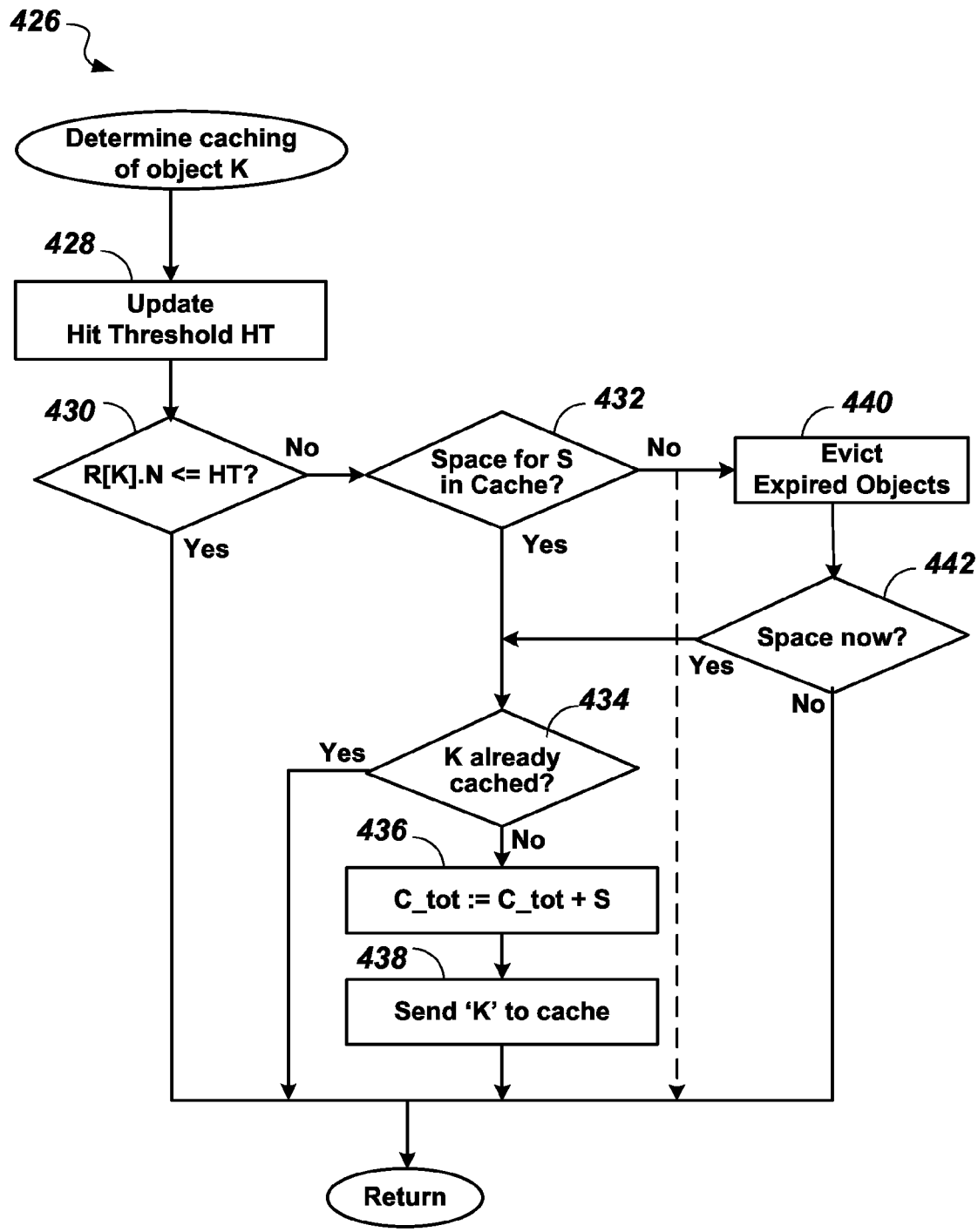
FIG. 4B shows a subroutine for performing the step 426 of FIG. 4.

FIG. 4B shows a subroutine for performing the step 426, including steps:
428 "Update Hit Threshold HT";
430 "Is value of hits N in Registry record R[K]<=HT?";
432 "Is there space for size 'S' in cache?"
434 "Is 'K' already cached?";
436 "C_tot:=C_tot+S";
438 "Send 'K' to cache";
440 "Evict Expired Objects";
442 "Is there sufficient space in cache now?";

In the step 428 "Update Hit Threshold HT", the hit threshold HT is updated as shown in the following FIG. 5.

Figure 5:
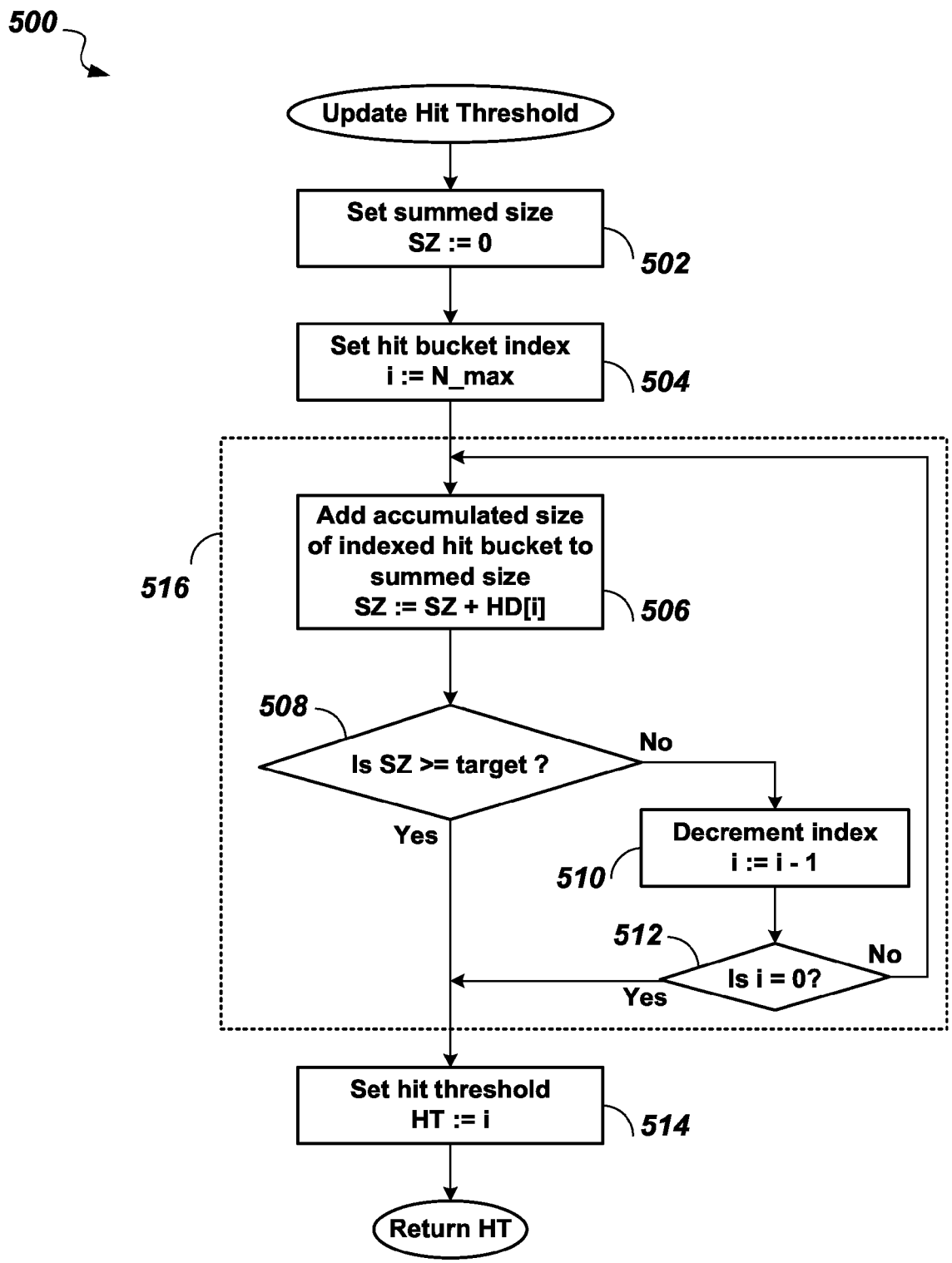
FIG. 5 shows a subroutine 500 for performing the step 428 "Update Hit Threshold HT" of FIG. 4.

FIG. 5 shows a subroutine 500 for performing the step 428 "Update Hit Threshold HT" of FIG. 4, comprising steps:
502 "Set summed size, SZ:=0";
504 "Set hit bucket index i:=N_max;
506 "Add accumulated size to summed size, SZ:=SZ+HD[i]";
508 "Is SZ>=(greater or equal) target?";
510 "Decrement index i:=i−1";
512 "Is index i=0?"; and
514 "Set hit threshold HT:=i".

The subroutine 500 with which the step 428 "Update Hit Threshold HT" may be implemented, includes a summing loop 516 (steps 506 to 510) in which a summed size "SZ" is computed by adding the accumulated cached OOB object sizes from the hit buckets according their hit number (hit bucket index "i"), starting at the highest hit bucket index, and continuing until either SZ is greater or equal to the target, or the index i has reached zero.

The variables "SZ" and "i" used in the summing loop 516, are initialized to 0 and N_max in the steps 502 and 504 respectively. N_max is the hit bucket index corresponding to the highest number of hits of any OOB object currently stored in the cache. In the summing loop 516, "SZ" is accumulated by adding the object sizes (OOB objects only) that have been accumulated in each indexed hit bucket (step 508), and decrementing the hit bucket index "i" (step 510) on each iteration. Summing of "SZ" stops when "SZ" exceeds the cache usage target, also referred to simply as "target" (which is fixed at C_S in the plateau phase, but gradually rises until C_S is reached in the convergence phase). Summing of "SZ" would also stop if the index "i" reaches 0 (the condition is tested in step 512), which would indicate that the cache is empty, presumably because all cached object have already expired. Please see also FIG. 3A which illustrates the relationship between the size values accumulated in the hit buckets HD[i], the targeted cache usage C_OOB, and the cache size threshold (C_S) in the case of the plateau phase.

In the step 514, the hit threshold HT is set to the last value of the hit bucket index "i", following which the Update HT function 500 returns the updated value of HT.

The reader's attention is directed now back to FIG. 4B.

In the step 430 "Is value of hits N in Registry record R[K]<=HT?", the registry record R[K] in which the object "K" is registered, is inspected and the recorded hit count of "K" compared with the hit threshold HT. If R[K].N is less than or equal to HT (exit "yes" from step 430), the object "K" is not cached, the step 426 is complete, and the subroutine of FIG. 4B returns. Otherwise (exit "no" from step 430), execution continues with the step 432 "Is there space for size 'S' in cache?" in which it is determined whether there is space in the cache for the object "K" with the size 'S'. If there is not sufficient space (exit "no" from step 432), execution continues with the step 440 "Evict Expired Objects", otherwise (exit "no" from step 432) execution continues with the step 434.

In the step 434 "Is 'K' already cached?", it is determined whether the object "K" is already cached. This should not be true if this was a first request for caching "K", but could be true on subsequent requests, see FIG. 4A. If "K" is already cached (exit "yes" from step 434) the step 426 is complete and the subroutine of FIG. 4B returns, otherwise (exit "no" from step 434) execution continues with the step 436 "C_tot:=C_tot+S" in which the size 'S' is added to the total cache usage C_tot, followed by step 438 "Send 'K' to cache" in which the object "K" is sent to the cache 114 to be cached.

After the step 438, the step 426 is complete and the subroutine of FIG. 4B returns.

It is noted that after failure of the step 432 "Is there space for size 'S' in cache?" (exit "no"), the subroutine of FIG. 4B could return immediately as shown in a dashed line. This would assume that object eviction from the cache would run in a separate processing thread. But, as indicated earlier, the processing of evicting expired media from the cache 114 is preferably only done when cache space is needed in the step 440 "Evict Expired Objects". An implementation of the step 440 is shown in more detail in FIG. 7 below.

In the step 442 "Is there sufficient space in cache now?", it is determined again whether there is space in the cache for 'S', the size of the object 'K'. If there is space now (exit "yes" from step 442), execution continues with the step 434, otherwise (exit "no" from step 434) the step 426 is complete and the subroutine of FIG. 4B returns.

Figure 6:
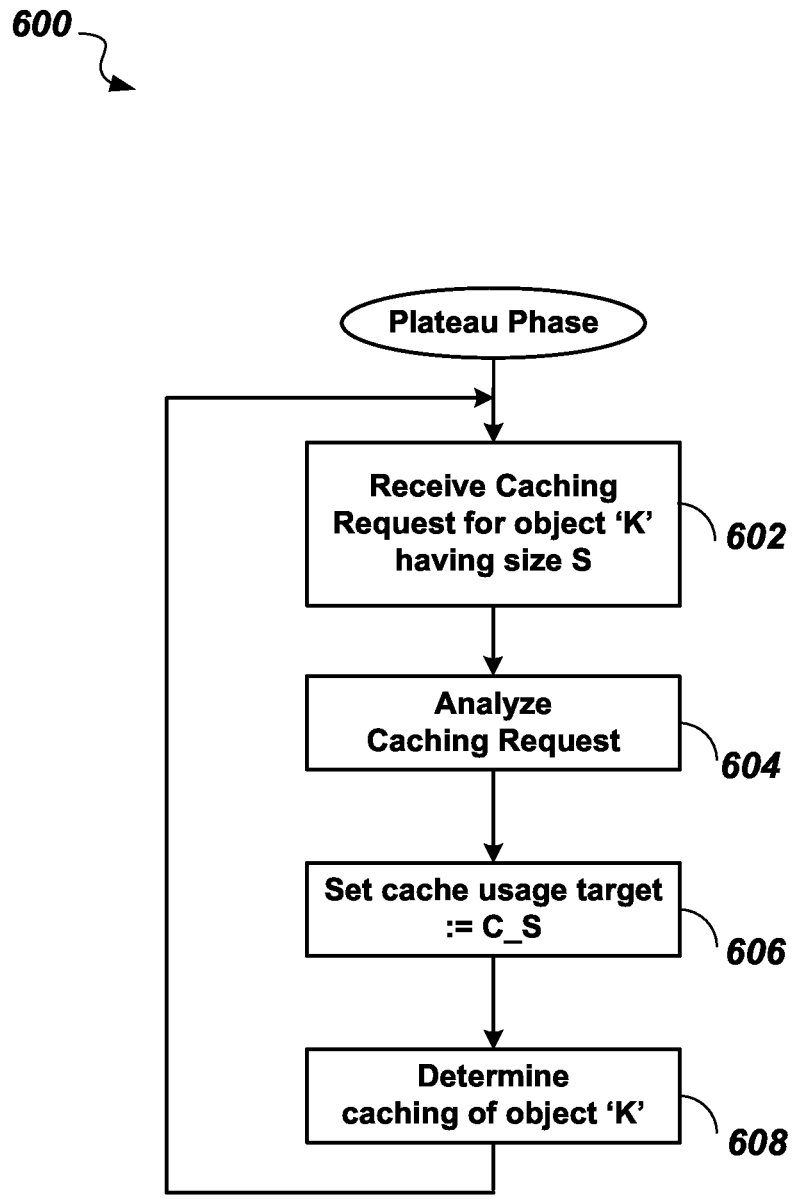
FIG. 6 shows a Plateau Phase function 600 for implementing the Plateau Phase 304 of FIG. 3.

FIG. 6 shows a Plateau Phase function 600 for implementing the Plateau Phase 304, including steps:
602 "Receive Caching Request for object 'K' having size 'S'", which has the same functionality as the step 404 of FIG. 4, but without the need to record the current time T1;
604 "Analyze Caching Request", which is identical to the step 412 (FIG. 4A);
606 "Set cache usage target:=C_S", in which the cache usage target is set to the fixed value C_S that was configured for use in the Plateau Phase 304; and
608 "Determine caching of object 'K'", which is identical to the step 426 (FIG. 4B).

After the step 608, execution in the Plateau Phase function 600 restarts with the step 602, forming a loop from step 602 to step 608 which runs indefinitely.

Figure 7:
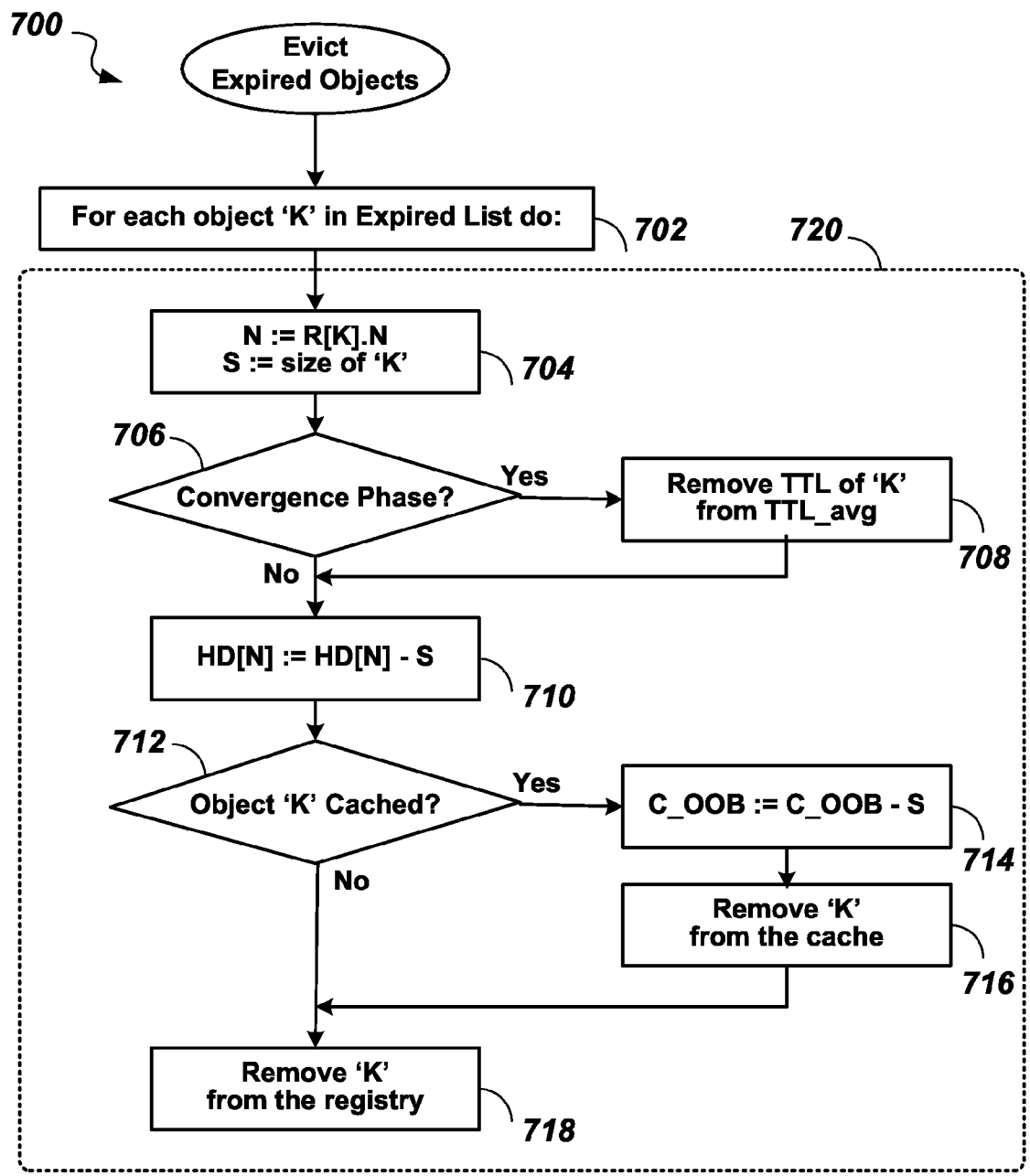
FIG. 7 shows an Object Eviction procedure 700, which is a preferred embodiment of the step 440 "Evict Expired Objects" of FIG. 4B.

FIG. 7 shows an Object Eviction procedure 700, which is a preferred embodiment of the step 440 "Evict Expired Objects" of FIG. 4B, and runs whenever there is a need to create space in the cache, as described above. Alternatively, the Object Eviction procedure 700 may also run periodically, e.g. at the end of each update interval T_upd.

The Object Eviction procedure 700 comprises steps:
702 "For each object 'K' in Expired List do:";
704 "Set N:=R[k].N and S:=size of 'K'";
706 "Is system in Convergence Phase?";
708 "Remove TTL of 'K' from TTL_avg";
710 "Set HD[N]:=HD[N]−S";
712 "Was object 'K' cached?";
714 "Set C_OOB:=C_OOB−S";
716 "Remove 'K' from the cache"; and
718 "Remove 'K' from the registry".

In the step 702 "For each object 'K' in Expired List do:", the object references in the Expired List 328 (see FIG. 3B) are scanned. Each object is successively removed from the Expired List 328 and temporarily named 'K', to be removed from the system by executing the steps 704 to 718. The steps 704 to 718 collectively form a procedure 720 for evicting each individual object.

In the step 704 "Set N:=R[K].N and S:=size of 'K'", a number 'N' indicating the number of times the object 'K' had been requested before expiring, and the size 'S' of the object 'K', are retrieved from the object registry 210.

In the step 706 "Is system in Convergence Phase?", it is determined whether the SCM 202 is (still) in the Convergence Phase 302. If the Convergence Phase 302 is still active (exit 'yes' from step 706) step 708 is first performed before step 710, otherwise (exit 'no' from step 706) step 708 is skipped and step 710 follows immediately.

In the step 708 "Remove TTL of 'K' from TTL_avg", the average time-to-live (TTL_avg) is recomputed by removing the TTL of the object 'K' from the average TTL (TTL_avg).

In the step 710 "Set HD[N]:=HD[N]−S", the value stored in the hit bucket of the hits distribution list 212 which had accumulated object sizes of objects having had 'N' hits, i.e. HD[N], is reduced by the size 'S' of the object 'K'.

In the step 712 "Is object 'K' cached?", it is determined whether the object 'K' is cached. If it is not cached (exit 'no' from step 712) step 718 is executed immediately, otherwise (exit 'yes' from step 706) steps 714 and 716 are executed before step 718.

In the step 714 "Set C_OOB:=C_OOB−S", the recorded cache usage by OOB objects (C_OOBconv or C_OOBplat depending on phase status) is reduced by the size of the object 'K'. In addition, the sizes of cached dependent objects (transcoded etc. objects derived from 'K') are subtracted from the total cache usage C_tot.

In the step 716 "Remove 'K' from the cache", a command is sent to the cache 114 to remove 'K' from the cache. In addition, all cached dependent objects (transcoded etc. objects derived from 'K') are removed from the cache.

In the step 718 "Remove 'K' from the registry", the object 'K' is removed from the list of objects registered in the object registry 210.

Caching of Dependent Objects

Figure 1:
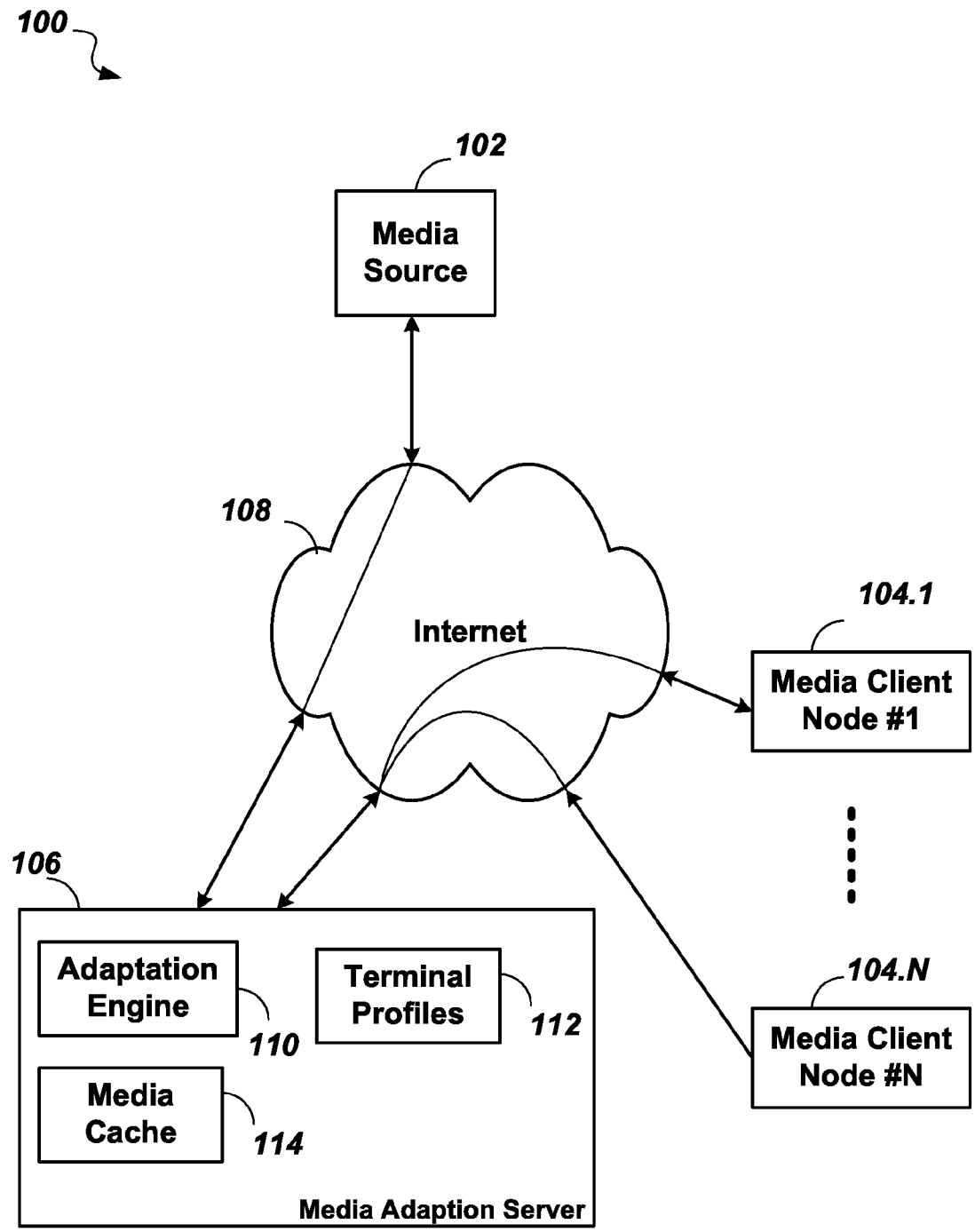
FIG. 1 illustrates a general media delivery system 100 of the prior art.

The decision of caching the most popular media, based on their number of requests (hits) as described in detail above, only applies to original objects (OOB objects) received from the media source 102 (FIG. 1), the caching criteria computation being based on the concept of the hit buckets 212.

Dependent objects (transcoded etc.) may also be cached, but only after their respective parent OOB objects are already cached. It may be the case that some dependent objects may be more worth caching than others because they save more network resources or transmission bandwidth, commonly referred to as a network cost, or simply cost. In the case of caching, the cost corresponds to saved bandwidth. If for example a transcoded file A saves 2 MB as compared to another transcoded file B that only saves 2 KB then, even if A has a hit threshold 50 times lower than B, it would be much more profitable to cache the transcoded version of A instead of the transcoded version of B.

Much of the cost reduction is already achieved by caching the OOB version of an object. The question then is, whether after having cached an OOB object, it is worthwhile to cache any particular adapted version of it.

To make this decision, it is necessary to track the number of hits for every adapted version, and of each object, separately. Then, any adapted version should be cached only when its individual hit number exceeds a threshold. For this purpose, a normalized Hit Threshold for adapted media "HT_TN" is introduced, which differs from HT.

For a given object, one can compute the saved bandwidth SB associated with its transcoded versions or transrated versions as $$SB=(original\_size-compressed\_size)*(number\ of\ requests),$$

where original_size is the size of an OOB object, and compressed_size is the size of an object compressed from the OOB object by adapting it according to some profile.

One can then define an Average Bandwidth Saving factor ABS_i for a given profile P_i as $$ABS\_i=\Sigma(compressed\_size)/\Sigma(original\_size)$$

where the sums contain the contributions from the objects that were transcoded using profile P_i and that are already cached, divided by the sum of the sizes of all the cached parents (the OOB objects) of the objects that were transcoded using profile P_i.

Values for ABS_i are stored as fractions in the Adaptation Savings array 218, and initializes as 1.0 when the SCM 202 is initialized. This is the default value before any object adapted according to profile "i" is cached.

To cache an adapted object for profile P_i, it must have had a number of hits greater than:

$$HT\_TN=IntegerRound(HT*ABS\_i).$$

This means that caching of the first adapted object for profile P_i, that is while ABS_i is still 1.0, its hit count must exceed the same HT as any OOB object. Then, as ABS_i evolves over time, and as adapted objects of profile P_i are cached ABS_i drops and eventually reaches a stable value.

As an example, assume that at some point ABS_i has settled to ⅕ and HT is 11 then HT_TN is 11/5 rounded to an integer, which gives 2. This means that adapted objects of profile P_i will be cached if they have been requested more than 2 times. If on the other hand HT is 2 then HT_TN will be ⅖, which rounds to 0. Hence in that case adapted objects of profile P_i will be cached if they have been requested more than zero times. In the second example, an adapted object of profile P_i is cached every time the SCM 202 receives a request for such an adapted object of profile P_i.

Thus having stored all of the ABS_i in the Adaptation Savings array 218 for corresponding transcode profiles P_i (or equivalently, ABS_r values for transrate cases) one may then multiply (HT) to compute a normalized HT_TN value to decide whether to cache an adapted object. The value of HT_TN may be computed and compared with the number of requests for a given adapted object and if the request number is greater than HT_TN, then the adapted object is cached. In this way profiles (or transrate cases) exhibiting a large saving (ABS_i or ABS_r) require fewer hits than other profiles which show smaller saving before being admitted into to be cached.

In another embodiment of the invention, caching of an object is enabled when its hit count is equal or greater than the hit threshold HT (in FIG. 4B, replace the step 430, that lists the condition R[K].N<=HT? with a new step 430' with the condition R[K].N<HT in the step 430). Using the step 430, one most probably will not be not overflowing the cache but one could underflow the cache, and not use it fully. Using the variation of the step 430', one most probably would overflow the cache but at least the cache would be fully used. In order to reduce the overflowing side effect one may could create a FIFO (First-In-First-Out) buffer of cached objects. A FIFO is a list in which the first inserted objects (the oldest) are also the first ones to be removed. Each time an object is cached it is inserted at the top of the FIFO, pushing all other cached objects to the bottom of the FIFO. When the SCM receives a new request for an already cached object, it puts it back at the top of the FIFO. When the cache runs out-of-space while trying to insert a new object in cache, which will happen when overflowing the cache, cache space can then be freed up by removing the object that was not requested for the longest time, namely the object at the bottom of the FIFO. This way one can replace in the cache the "oldest" objects with the "newest" objects.

Although the embodiments of the invention have been described in detail, it will be apparent to one skilled in the art that variations and modifications to the embodiment may be made within the scope of the following claims.

What is claimed is:

1. A method for caching objects in a self-tuning cache memory, comprising:
employing a hardware processor for:
(a) performing operations during a convergence phase, comprising repeating until a convergence cache size threshold reaches a cache size threshold, the cache size threshold being lower than a cache memory capacity, the convergence cache size threshold being a target cache usage during the convergence phase:
(a1) receiving a request (hit) for an object having a predetermined time to live;
(a2) caching the object after receiving an $N^{th}$ request for the object, N being greater than a hit threshold HT, provided there is space available in the cache memory;
(a3) adjusting the hit threshold HT as a function of the convergence cache size threshold;
(a4) increasing the convergence cache size threshold as a function of an average time to live (TTL_avg), the TTL_avg being an average time to live time of non-expired objects and
(a5) terminating the convergence phase provided a duration of the convergence phase is greater than or equal to the TTL_avg;
thus filling the cache memory with most popular objects.

2. The method of claim 1, further comprising:
(b) provided the convergence cache size threshold has reached the cache size threshold, performing plateau phase operations, comprising:
(b1) receiving requests (hits) for new objects having respective predetermined times to live;
(b2) caching the new objects after receiving corresponding $N^{th}$ requests for the new objects, provided there is space available in the cache memory; and
(b3) removing expired objects having expired times to live from the cache memory so that newly cached objects are balanced with the expired objects, thereby maintaining occupancy of the cache memory at the cache size threshold;
thus providing a self-tuning management of the cache memory.

3. The method of claim 1 wherein the step (a3) comprises adjusting the hit threshold HT as a function of an actual total cache memory usage.

4. The method of claim 1 wherein the step (a3) further comprise adjusting the hit threshold HT based on an actual total cache memory usage, an average size of cached objects, and the average time to live.

5. The method of claim 1, wherein the step (a3) further comprises generating a hits distribution list according to a corresponding number of requests received by each object, and adjusting the hit threshold HT so that objects with the most hits are cached.

6. A method for caching objects in a self-tuning cache memory, comprising:
employing a hardware processor for:
(a) performing operations during a convergence phase, comprising repeating until a convergence cache size threshold reaches a cache size threshold, the cache size threshold being lower than a cache memory capacity, the convergence cache size threshold being a target cache usage during the convergence phase:
(a1) receiving a request (hit) for an object having a predetermined time to live;
(a2) caching the object after receiving an $N^{th}$ request for the object, N being greater than a hit threshold HT, provided there is space available in the cache memory;
(a3) adjusting the hit threshold HT as a function of the convergence cache size threshold, a total cache memory usage, the cache size threshold, a time interval for cache update, and an average time to live time of non-expired objects; and
(a4) increasing the convergence cache size threshold as the function of the average time to live of non-expired objects
thus filling the cache memory with most popular objects.

7. The method of claim 6, further comprises generating a hits distribution list according to a corresponding number of requests received by each object, and adjusting the hit threshold HT so that objects with the most hits are cached.

8. A method for caching objects in a self-tuning cache memory, comprising:
employing a hardware processor for:
(a) performing operations during a convergence phase, comprising repeating until a convergence cache size threshold reaches a cache size threshold, the cache size threshold being lower than a cache memory capacity, the convergence cache size threshold being a target cache usage during the convergence phase:
(a1) receiving a request (hit) for an object having a predetermined time to live;
(a2) caching the object after receiving an $N^{th}$ request for the object, N being greater than a hit threshold HT, provided there is space available in the cache memory;
(a3) adjusting the hit threshold HT as a function of the convergence cache size threshold; and
(a4) increasing the convergence cache size threshold as a function of an average time to live (TTL_avg), the TTL_avg being an average time to live time of non-expired objects;
further comprising determining the convergence cache size threshold as a function of:
an elapse time;
a start time;
the average time to live time of non-expired objects; and
the cache size threshold
thus filling the cache memory with most popular objects.

9. The method of claim 8, further comprises generating a hits distribution list according to a corresponding number of requests received by each object, and adjusting the hit threshold HT so that objects with the most hits are cached.

10. A method for caching objects in a self-tuning cache memory, comprising:
employing a hardware processor for:
(a) performing operations during a convergence phase, comprising repeating until a convergence cache size threshold reaches a cache size threshold, the cache size threshold being lower than a cache memory capacity, the convergence cache size threshold being a target cache usage during the convergence phase:
(a1) receiving a request (hit) for an object having a predetermined time to live;
(a2) caching the object after receiving an $N^{th}$ request for the object, N being greater than a hit threshold HT, provided there is space available in the cache memory;
(a3) dynamically adjusting the hit threshold HT as a function of the convergence cache size threshold; and (a4) increasing the convergence cache size threshold as a function of an average time to live (TTL_avg), the TTL_avg being an average time to live time of non-expired objects;
the method further comprising:
adapting the object into an adapted object according to a destination profile; and
determining a hit threshold for caching adapted objects, by reducing the hit threshold HT as a function of an average size reduction of adapted objects with respect to a size of respective objects from which the adapted objects were adapted
thus filling the cache memory with most popular objects.

11. The method of claim 10, further comprises generating a hits distribution list according to a corresponding number of requests received by each object, and adjusting the hit threshold HT so that objects with the most hits are cached.

12. A system for caching objects in a self-tuning cache memory, the system comprising:
a non-transitory computer readable storage medium having computer readable instructions stored thereon for execution by a processor, causing the processor to:
(a) perform operations at a convergence phase, repeating until a convergence cache size threshold reaches a cache size threshold, the cache size threshold being lower than a cache memory capacity, the convergence cache size threshold being a target cache usage during the convergence phase, causing the processor to:
(a1) receive a request (hit) for an object having a predetermined time to live;
(a2) cache the object after receiving an $N^{th}$ request for the object, N being greater than a hit threshold HT, provided there is space available in the cache memory;
(a3) adjust the hit threshold HT as a function of the convergence cache size threshold;
(a4) increase the convergence cache size threshold as a function of an average time to live (TTL_avg), the TTL_avg being an average time to live time of non-expired objects; and
(a5) terminate the convergence phase provided a duration of the convergence phase is greater than or equal to the TTL_avg;
thus filling the cache memory with most popular objects.

13. The system of claim 12, wherein, provided the convergence cache size threshold has reached the cache size threshold, the computer readable instructions further cause the processor to:
(b) perform operations at a plateau phase, wherein the computer readable instructions further cause the processor to:
(b1) receive requests (hits) for new objects having respective predetermined times to live;
(b2) cache the new objects after receiving corresponding $N^{th}$ requests for the new objects, provided there is space available in the cache memory; and
(b3) remove expired objects having expired times to live from the cache memory so that newly cached objects are balanced with the expired objects, thereby maintaining occupancy of the cache memory at the cache size threshold;
thus providing a self-tuning management of the cache memory.

14. The system of claim 12 wherein the computer readable instructions further cause the processor to adjust the hit threshold HT as a function of an actual total cache memory usage.

15. The system of claim 12 wherein the computer readable instructions further cause the processor to adjust the hit threshold HT based on an actual total cache memory usage, an average size of cached objects, and the average time to live.

16. The system of claim 12, wherein the computer readable instructions further cause the processor to generate a hits distribution list according to a corresponding number of requests received by each object, and adjusting the hit threshold HT so that objects with the most hits are cached.

17. A system for caching objects in a self-tuning cache memory, the system comprising:
a non-transitory computer readable storage medium having computer readable instructions stored thereon for execution by a processor, causing the processor to:
(a) perform operations at a convergence phase, repeating until a convergence cache size threshold reaches a cache size threshold, the cache size threshold being lower than a cache memory capacity, the convergence cache size threshold being a target cache usage during the convergence phase, causing the processor to:
(a1) receive a request (hit) for an object having a predetermined time to live;
(a2) cache the object after receiving an $N^{th}$ request for the object, N being greater than a hit threshold HT, provided there is space available in the cache memory;
(a3) adjust the hit threshold HT as a function of the convergence cache size threshold, a total cache memory usage, the cache size threshold, a time interval for cache update, and an average time to live time of non-expired objects; and
(a4) increase the convergence cache size threshold as a function of the average time to live of non-expired objects;
thus filling the cache memory with most popular objects.

18. The system of claim 17, wherein the computer readable instructions further cause the processor to generate a hits distribution list according to a corresponding number of requests received by each object, and adjusting the hit threshold HT so that objects with the most hits are cached.

19. A system for caching objects in a self-tuning cache memory, the system comprising:
a non-transitory computer readable storage medium having computer readable instructions stored thereon for execution by a processor, causing the processor to:
(a) perform operations at a convergence phase, repeating until a convergence cache size threshold reaches a cache size threshold, the cache size threshold being lower than a cache memory capacity, the convergence cache size threshold being a target cache usage during the convergence phase, causing the processor to:
(a1) receive a request (hit) for an object having a predetermined time to live;
(a2) cache the object after receiving an $N^{th}$ request for the object, N being greater than a hit threshold HT, provided there is space available in the cache memory;
(a3) adjust the hit threshold HT as a function of the convergence cache size threshold; and
(a4) increase the convergence cache size threshold as a function of an average time to live (TTL_avg), the TTL_avg being an average time to live time of non-expired objects;
wherein the computer readable instructions further cause the processor to determine the convergence cache size threshold as a function of:

an elapse time;

a start time;

the average time to live time of non-expired objects; and the cache size threshold;

thus filling the cache memory with most popular objects.

20. The system of claim 19, wherein the computer readable instructions further cause the processor to generate a hits distribution list according to a corresponding number of requests received by each object, and adjusting the hit threshold HT so that objects with the most hits are cached.

21. A system for caching objects in a self-tuning cache memory, the system comprising:
- a non-transitory computer readable storage medium having computer readable instructions stored thereon for execution by a processor, causing the processor to:
- (a) perform operations at a convergence phase, repeating until a convergence cache size threshold reaches a cache size threshold, the cache size threshold being lower than a cache memory capacity, the convergence cache size threshold being a target cache usage during the convergence phase, causing the processor to:
  - (a1) receive a request (hit) for an object having a predetermined time to live;
  - (a2) cache the object after receiving an $N^{th}$ request for the object, N being greater than a hit threshold HT, provided there is space available in the cache memory;
  - (a3) dynamically adjust the hit threshold HT as a function of the convergence cache size threshold; and
  - (a4) increase the convergence cache size threshold as a function of an average time to live (TTL_avg), the TTL_avg being an average time to live time of non-expired objects;

wherein the computer readable instructions further cause the processor to:
- adapt the object into an adapted object according to a destination profile; and
- determine a hit threshold for caching adapted objects, by reducing the hit threshold HT as a function of an average size reduction of adapted objects with respect to a size of respective objects from which the adapted objects were adapted;

thus filling the cache memory with most popular objects.

22. The system of claim 21, wherein the computer readable instructions further cause the processor to generate a hits distribution list according to a corresponding number of requests received by each object, and adjusting the hit threshold HT so that objects with the most hits are cached.

* * * * *

UNITED STATES PATENT AND TRADEMARK OFFICE
CERTIFICATE OF CORRECTION

PATENT NO. : 9,811,470 B2  
APPLICATION NO. : 14/828428  
DATED : November 7, 2017  
INVENTOR(S) : Louis Benoit et al.

Page 1 of 1

It is certified that error appears in the above-identified patent and that said Letters Patent is hereby corrected as shown below:

In the Claims

Column 24, Line 12, "adapted" should read --adapted,--

Column 24, Line 44, "threshold" should read --threshold,--

Signed and Sealed this  
Twenty-fifth Day of June, 2019

Andrei Iancu  
*Director of the United States Patent and Trademark Office*